US007002659B1

United States Patent
(12) United States Patent
Yamazaki et al.

(10) Patent No.: US 7,002,659 B1
(45) Date of Patent: Feb. 21, 2006

(54) LIQUID CRYSTAL PANEL AND LIQUID CRYSTAL PROJECTOR

(75) Inventors: Shunpei Yamazaki, Tokyo (JP); Jun Koyama, Kanagawa (JP); Kazuhiko Tamai, Nara (JP); Yutaka Takafuji, Nara (JP)

(73) Assignees: Semiconductor Energy Laboratory Co., Ltd., Kanagawa-ken (JP); Sharp Kabushiki Kaisha, Osaka (JP)

( * ) Notice: Subject to any disclaimer, the term of this patent is extended or adjusted under 35 U.S.C. 154(b) by 272 days.

(21) Appl. No.: 09/717,138

(22) Filed: Nov. 22, 2000

(30) Foreign Application Priority Data

Nov. 30, 1999 (JP) ................................ 11-339056

(51) Int. Cl.
*G02F 1/1339* (2006.01)

(52) U.S. Cl. ........................... 349/155; 349/5; 349/95; 349/156; 349/106

(58) Field of Classification Search .................... 349/5, 349/95, 155, 106, 156
See application file for complete search history.

(56) References Cited

U.S. PATENT DOCUMENTS

| | | | | |
|---|---|---|---|---|
| 5,643,826 A | | 7/1997 | Ohtani et al. | |
| 5,739,882 A | * | 4/1998 | Shimizu et al. | 349/123 |
| 5,831,710 A | * | 11/1998 | Colgan et al. | 349/156 |
| 5,923,962 A | | 7/1999 | Ohtani et al. | |
| 5,952,676 A | | 9/1999 | Sato et al. | |
| 5,978,063 A | | 11/1999 | Crawford et al. | |
| 5,982,471 A | * | 11/1999 | Hirakata et al. | 349/155 |
| 6,195,143 B1 | * | 2/2001 | Ogawa | 349/95 |
| 6,680,487 B1 | | 1/2004 | Kokubo et al. | |
| 2003/0173567 A1 | | 9/2003 | Kokubo et al. | |

FOREIGN PATENT DOCUMENTS

| | | | |
|---|---|---|---|
| JP | 61-064158 | | 4/1986 |
| JP | 03-248125 | | 11/1991 |
| JP | 05-281558 | | 10/1993 |
| JP | 07-130652 | | 5/1995 |
| JP | 09-073093 | | 3/1997 |
| JP | 10-068955 | | 3/1998 |
| JP | 10-096955 | * | 4/1998 |

OTHER PUBLICATIONS

M. Oikawa and K. Iga, "Distributed-Index Planar Microlens", Applied Optics, vol. 21, No. 6, Mar. 15, 1982, pp. 1052-1056.

(Continued)

*Primary Examiner*—Dung T. Nguyen
*Assistant Examiner*—George Y. Wang
(74) *Attorney, Agent, or Firm*—Eric J. Robinson; Robinson Intellectual Property Law Office, P.C.

(57) ABSTRACT

There is provided a liquid crystal panel in which the brightness of an image is high, and deterioration in display quality due to defects such as uneven display or uneven brightness is suppressed. The liquid crystal panel includes a pixel portion including a plurality of thin film transistors and pixel electrodes formed on a first substrate, a second substrate, a liquid crystal and gap holding members provided between the first substrate and the second substrate, and a microlens array including a plurality of microlenses and provided on a surface of the second substrate, the surface being opposite to the first substrate.

69 Claims, 27 Drawing Sheets

OTHER PUBLICATIONS

M. Oikawa et al., "distributed-index Planar Microlens Array Prepared from deep electromigration", Electronics Letters, vol. 17, No. 13, pp. 452-454, Jun. 25, 1981.

Zoran D. Popovic et al., "Technique for Monolithic Fabrication of Microlens Arrays", Apr. 1, 1988, vol. 27, No. 7, Applied Optics, pp. 1281-1284.

* cited by examiner

LIQUID CRYSTAL PANEL AND LIQUID CRYSTAL PROJECTOR

BACKGROUND OF THE INVENTION

1. Field of the Invention

The present invention relates to a liquid crystal panel and a liquid crystal projector using the liquid crystal panel.

2. Description of the Related Art

In recent years, a technique for fabricating a semiconductor device in which a semiconductor thin film is formed on an inexpensive glass substrate, such as a thin film transistor (TFT), has been rapidly developed. The reason is that demand for an active matrix type liquid crystal panel has risen.

The active matrix type liquid crystal panel (liquid crystal panel) is such that a thin film transistor (pixel TFT) is disposed for each of several tens to several million pixel portions disposed in matrix form and an electric charge going in and out of each pixel electrode is controlled by a switching function of the pixel TFT.

Besides, particularly, a projection type display device using a liquid crystal panel, a so-called projector has rapidly increased its market. This is because, as compared with a projector using a CRT, the liquid crystal projector has excellent color reproducibility, is small and lightweight, and has low power consumption.

The liquid crystal projector is classified into a three-plate type and a single plate type according to the number of liquid crystal panels to be used.

As compared with the three-plate type liquid crystal projector, since optical parts of the single plate type liquid crystal projector is ⅓ thereof, it is superior in the cost, size and the like. However, in the case where the same liquid crystal panel is used in the three-plate type and a conventional single plate type, while three colors are overlapped with each other on one pixel in the three-plate type, the single plate type can merely use one pixel as a pixel of one color, so that the single plate type is inferior to the three-plate type in picture quality. Further, in the single plate type liquid crystal projector, an unnecessary component of white light from a light source is absorbed by a color filter so that an image of a desired color is obtained. Thus, only ⅓ of white light incident into the liquid crystal panel is transmitted, and usage efficiency of light is low.

For the purpose of improving the brightness of the single plate type liquid crystal projector, although a method of making the light source bright has been adopted, there have occurred problems of heat generation due to light absorption of a color filter and light resistance.

Then, for the purpose of overcoming the defects of the conventional single plate type liquid crystal projector, a three-plate type liquid crystal projector using three dichroic mirrors was devised.

Reference will be made to FIG. 14. FIG. 14 is a structural view of an optical system of the three-plate type liquid crystal projector. Reference numeral 1401 designates a light source made of a lamp and a reflector. White light having a spectrum of red, green and blue is emitted from the light source 1401. The light source 1401 is set so that the parallelism of the emitted white light becomes high. The reflector is used for effectively use the white light emitted from the lamp.

The white light emitted from the light source 1401 enters dichroic mirrors 1402 and 1403. These two dichroic mirrors 1402 and 1403 split the white light from the light source 1401 into lights of three primary colors (red, green, blue).

The dichroic mirror 1402 reflects only the light of a blue (B) wavelength region and allows other lights to be transmitted. The dichroic mirror 1403 reflects only the light of a red (R) wavelength region in the lights transmitted through the dichroic mirror 1402, and allows other lights to be transmitted. A total reflection mirror 1404 reflects the light of a green wavelength region transmitted through the dichroic mirrors 1402 and 1403. By adopting such structure, the white light emitted from the light source 1401 can be split into the three primary colors.

The blue and green lights split by the dichroic mirror 1402 and the total reflection mirror 1404 are reflected by total reflection mirrors 1406 and 1405, and respectively enter liquid crystal panels 1407 and 1409. The red light split by the dichroic mirror 1403 enters a liquid crystal panel 1408. The transmitted lights of blue, red and green transmitted through the liquid crystal panels 1407, 1408 and 1409 are condensed by a dichroic prism 1410 and are projected on a screen by a projection lens 1411.

In recent years, the liquid crystal projector is required to become thin and lightweight, and at the same time, to achieve high fineness, high picture quality, and high brightness.

For the purpose of making the liquid crystal projector thin and lightweight, it becomes necessary to miniaturize a substrate size of the liquid crystal panel. In order to decrease the substrate size and not to degrade the picture quality, the area of a pixel portion must be inevitably reduced by reducing a pixel pitch.

FIG. 15 is a schematic view of a pixel of a liquid crystal panel. A wiring 12, a pixel TFT 15 including an active layer 13 and a gate electrode 14 as a part of the wiring 12 and a pixel electrode 16 are provided as shown in FIG. 15. A black matrix 17 covering a region which is not required to transmit visible light is provided over the wiring 12 and the pixel TFT 15. The black matrix (BM) indicates a film having a light shielding property and provided over a wiring, a pixel TFT, and the like which are not required to transmit visible light.

A pixel pitch L indicates a shorter one of distances between the wirings 12 opposite to each other through a pixel 11. In the case where the distances between the wirings 12 opposite to each other are such that the distance between the wirings in the row direction is equal to that in the column direction, the pixel pitch indicates a distance between the wirings in both.

It is difficult to reduce the thin film transistor (pixel TFT) for driving a liquid crystal and the wiring at the same scale as a reduction in the pixel pitch.

If the thin film transistor is made excessively small, the amount of flowing current is limited. Thus, if the pixel TFT is excessively small, it becomes difficult to cause a current necessary for driving the liquid crystal to flow. Besides, if the wiring is made excessively, thin, the resistance of the wiring becomes large. For this reason, there is a limit in the reduction of the pixel TFT and the wiring.

Thus, if the pixel pitch is made small, the ratio of a portion covered with the BM, such as the pixel TFT and the wiring, to the pixel becomes large, and an opening ratio is lowered.

When the opening ratio is lowered, the brightness of an image is lowered unless the brightness of a light source is raised. However, if the brightness of the light source is raised, consumed electric power becomes large, which is not preferable.

Then, in order to raise the brightness of the image without raising the brightness of the light source, it is conceivable that a microlens array is formed at the side of the liquid crystal panel where light enters.

The microlens array shown here includes a plurality of microlenses on one-on-one basis with respect to the respective pixels. By the microlens array, the light originally blocked off by the black matrix is condensed to the part of the pixel portion through which the visible light is transmitted. Thus, the usage efficiency of light can be raised, so that the brightness of the image can be raised without raising the brightness of the light source.

FIG. 16 is a sectional view of a liquid crystal panel including a microlens array. A TFT substrate 21, a pixel TFT 23, a pixel electrode 22, an orientation film 31, a liquid crystal 24, a counter electrode 25, a BM 26, and a counter substrate 28 are provided as shown in the drawing.

A microlens array 27 including a plurality of microlenses 30 is provided at a side opposite to the TFT substrate 21 across the counter substrate 28. Although the microlens array 27 is provided as if it is in contact with the counter substrate 28 in FIG. 16, it may be provided apart from the counter substrate 28.

One microlens 30 is provided so as to correspond to one pixel, and the size of the microlens 30 is determined by the pixel pitch.

The light incoming from the side of the counter substrate 28 is condensed by the microlens 30 and enters an opening portion 29 of a pixel.

FIG. 17 is a sectional view of the microlens 30. The light incoming from a spherical surface of the microlens 30 is refracted and passes through a focal point O. A distance between a principal point O' of the microlens and the focal point O is a focal distance f. In the microlens shown in the drawing, although the principal point is an apex of the sphere of the microlens, the position of the principal point becomes different according to the shape of the microlens.

When the microlens 30 is regarded as a part of a sphere, the center of the sphere is made a center C, and its radius is made a radius of curvature r.

Since a diameter D of the microlens is determined by a pixel pitch of a corresponding pixel, when the area of the pixel portion of the liquid crystal panel is reduced, it is necessary that the diameter D of the microlens is also reduced.

In order to decrease the diameter D of the microlens, there are a method of decreasing the diameter while similar figures are kept without changing the radius of curvature r, and a method of decreasing the radius of curvature r.

The former is not easy in design and manufacture, and it is difficult to increase the number (integration) of microlenses per unit area of the microlens array.

An F value of a lens is a value obtained by dividing a focal distance by a diameter. Lenses having the same radius of curvature have the same focal distance. Thus, if the diameter D is made small while similar figures are kept without changing the radius of curvature r, the F value becomes large, and the amount of light per unit area reaching an image plane becomes small, which is not preferable.

The latter method of decreasing the diameter D by decreasing the radius of curvature r is relatively easy in design and manufacture as compared with the former method. However, if the radius of curvature r is made small, the focal depth becomes shallow, and it becomes difficult to effectively condense light to the opening portion of the pixel. The reason will be described below in detail.

The focal depth is a movement distance of an imaging plane in which required resolution is satisfied when the imaging plane moves in an optical axis direction. The focal depth T is obtained by the following expression 1 from the required resolution S and the F value.

$$T=2\times S\times F \quad \text{[Expression 1]}$$

In this case, the required resolution S is in proportion to the size of the opening portion of the pixel, and when the opening portion is large, that is, the pixel pitch is large, the required resolution S becomes large. On the contrary, when the opening portion is small, that is, the pixel pitch is small, the required resolution S becomes small.

The F value is obtained by the following expression 2 from the focal distance f and the diameter D of the microlens.

$$F=f/D \quad \text{[Expression 2]}$$

The diameter D of the microlens is in proportion to the pixel pitch, and like the required resolution S, when the pixel pitch is large, the diameter D becomes large, and when the pixel pitch is small, the diameter D also becomes small.

The focal distance f is obtained by the following expression 3 from the radius of curvature r of the microlens, and a constant n determined by the refractivity of the microlens and the refractivity of a medium.

$$f=nr \quad \text{[Expression 3]}$$

When the focal depth T is obtained from the expressions 1 to 3, the following expression 4 is derived.

$$T=(2n\times r)\cdot S/D \quad \text{[Expression 4]}$$

Here, the required resolution S and the diameter D are values determined by the pixel pitch and the size of the opening portion, and have the same first-order parameter. Thus, from the expression 4, it is understood that the focal depth T is determined by the radius of curvature r. When the radius of curvature r of the microlens array is made large, the focal depth T also becomes deep. On the contrary, when the radius of curvature r is made small, the focal depth T also becomes shallow.

The upper surfaces of the TFT substrate and the counter substrate are not completely flat. Thus, in the case where a cell gap is irregular over the whole substrate, even if there is no problem when the diameter D of the microlens is large, there has been a problem that uneven brightness of an image is seen when the diameter D is made small. Then, it is required to make the cell gap more uniform.

Besides, since the microlenses are formed on one surface of a microlens array substrate, the microlens array substrate is not flat, but a warp is produced. In the case where the microlens array is bonded to the counter substrate through an adhesive such as an ultraviolet ray curing resin, because of unevenness in a hardening time of the adhesive, contraction of the ultraviolet ray curing resin at the time of hardening, and hardening of the ultraviolet ray curing resin in the state where an applied pressure at the time of bonding remains, a warp is produced in the counter substrate after the bonding. Further, in the case where thermal expansion coefficients of the microlens array substrate and the counter substrate are different from each other, a warp of the substrate due to a temperature chance is produced. Besides, in the case where a thin substrate is used from the viewpoint of achievement of light weight and low cost, since the substrate lacks rigidity, the warp of the substrate is produced. As a result, there has been a problem that the cell gap becomes irregular and uneven color is produced. Then, it is required to make the cell gap more uniform.

In the case where spherical spacers are provided between the TFT substrate and the counter substrate, it is possible to remove a difference (error) in the cell gap due to places on the substrate to a certain degree. However, in future, since it is necessary to fabricate a liquid crystal panel with a pixel pitch of 40 μm or less, preferably 30 μm or less, when the pixel pitch becomes small, even the spherical spacer of several μm results in deterioration of display quality when it exists at an opening portion of a pixel.

FIG. 18 is a schematic view of a pixel using a spherical spacer. A wiring 42, a pixel TFT 45 including an active layer 43 and a gate electrode 44 as a part of the wiring 42, and a pixel electrode 46 are provided as shown in the drawing. A BM 47 is provided over the wiring 42 and the pixel TFT 45 to cover a region which is not required to transmit visible light.

When a spherical spacer 49 is positioned on the pixel electrode 46 of an opening portion 48, since the orientation of a liquid crystal material is disturbed in the vicinity of the spherical spacer 49, there is a case where a disturbance (disclination) of an image display is observed.

Similarly, even in the case where the spherical spacer 49 is provided on the wiring 42, when the spherical spacer 49 is close to the opening portion, there is a case where the disclination 50 is observed.

Besides, the upper surfaces of the TFT substrate and the counter substrate themselves are not completely flat. Thus, even if the spherical spacers are scattered on the upper surface of the TFT substrate, the cell gap becomes different according to the places on the substrate, and it is impossible to realize a uniform cell gap over the whole substrate. As a result, a deformation is produced in the counter substrate. In a liquid crystal panel in which the difference of the cell gap due to the places on the substrate is produced or the deformation is produced in the counter substrate, there appear such defects that uneven display occurs or interference fringes occur on the upper surface of the counter substrate.

Further, in the conventional spherical spacers, when a liquid crystal material is injected, the spherical spacers themselves flow by the flow of the liquid crystal material, and consequently, uniform spacer scattering density can not be obtained, and the spacers can cause the difference in the cell gap due to the places on the substrate.

A generally manufactured or experimentally manufactured liquid crystal panel secures a cell gap of about 4 to 6 μm irrespective of a pixel pitch. Besides, in a liquid crystal panel using a ferroelectric liquid crystal which has attracted attention recently, a small cell gap is required from its characteristics.

However, it is generally difficult to fabricate a cell having a small and uniform cell gap by using the conventional spherical spacer.

As described above, in the case where the cell gap is controlled by using the conventional spherical spacer, there is a problem that it is difficult to obtain an excellent display due to various factors.

SUMMARY OF THE INVENTION

In view of the foregoing problems, an object of the present invention is to provide a liquid crystal projector which is made thin and lightweight, and at the same time, which is made to have high fineness, high picture quality, and high brightness. Another object of the present invention is to provide a liquid crystal projector in which the brightness of an image is raised without raising the brightness of a light source, and deterioration of display quality due to uneven display, uneven brightness or the like is suppressed.

According to the present invention, a three-plate type liquid crystal projector includes three liquid crystal panels each including a TFT substrate having a pixel portion, a counter substrate having a counter electrode, and a liquid crystal and a gap holding member which are provided between the substrates, and a microlens array provided at a side of the liquid crystal panel where light enters, that is, at a side of the counter substrate. Particularly, the present invention relates to a small liquid crystal panel with a substrate sizing diagonally 1 inch or less.

The gap holding member is formed by etching an insulating film formed on the TFT substrate or the counter substrate. Thus, contrary to a spherical spacer, it is possible to dispose the spacer at a desired position. A cell gap can be controlled more uniformly than a case where the spherical spacer is used.

The shape of the gap holding member is different from that of the conventional spherical spacer, and is a column shape with a bottom of a circle, an ellipse, or a polygon, or with a taper-shaped side. Besides, the shape is such as is obtained by cutting off a part of a sphere.

The gap holding member is formed over a contact portion between a pixel electrode of a pixel and a wiring (drain wiring) connected to a drain region of a pixel TFT. The contact portion between the pixel electrode and the drain wiring is not positioned at an opening portion of the pixel, in other words, a region which is used for actual display and through which visible light is transmitted. Since the contact portion is distant from the region (opening portion) through which the visible light is transmitted to such a degree that the orientation of a liquid crystal material is not disturbed, a disturbance (disclination) of an image display is not easily produced.

A plurality of microlenses included in the microlens array are provided on one-on-one basis with respect to a plurality of pixels included in the pixel portion.

Since the two substrates of the liquid crystal panel can be uniformly controlled by the gap holding member to have the cell gap of a desired value, even if a focal depth becomes shallow as the microlens array becomes minute, it becomes possible to suppress the deterioration of display quality due to uneven display, uneven brightness or the like of the liquid crystal projector, such as disclination or interference fringes.

Besides, according to the structure of the present invention, the brightness of an image can be raised without raising the brightness of a light source, and the liquid crystal projector is made thin and lightweight, and at the same time, it becomes possible to realize high fineness, high quality, and high brightness.

The present invention is effective especially in a small liquid crystal panel with a substrate sizing diagonally 1 inch or less.

According to the present invention, there is provided a liquid crystal panel comprising:

- a first substrate;
- a second substrate;
- a liquid crystal provided between the first substrate and the second substrate;
- a plurality of gap holding members provided between the first substrate and the second substrate; and
- a microlens array including a plurality of microlenses, characterized in that the microlens array is provided in the first substrate at a side opposite to the second substrate.

According to the present invention, there is provided a liquid crystal panel comprising:

a first substrate including a plurality of pixel electrodes:

a second substrate including a counter electrode, a liquid crystal;

a plurality of gap holding members; and a microlens array including a plurality of microlenses, characterized in that:

the first substrate faces the second substrate through the plurality of pixel electrodes, the counter electrode, the liquid crystal, and the plurality of gap holding members; and the microlens array is provided in the first substrate at a side opposite to the second substrate.

According to the present invention, there is provided a liquid crystal panel comprising:

a first substrate including a plurality of pixel electrodes;

a second substrate including a counter electrode;

a liquid crystal;

a plurality of gap holding members; and a microlens array including a plurality of microlenses, characterized in that:

the first substrate faces the second substrate through the plurality of pixel electrodes, the counter electrode, the liquid crystal, and the plurality of gap holding members; and the microlens array is provided in the second substrate at a side opposite to the first substrate.

According to the present invention, there is provided a liquid crystal panel comprising:

a first substrate including a plurality of pixel electrodes;

a second substrate including a counter electrode;

a liquid crystal;

a plurality of gap holding members; and a microlens array including a plurality of microlenses, characterized in that:

the first substrate faces the second substrate through the plurality of pixel electrodes, the counter electrode, the liquid crystal, and the plurality of gap holding members; and the microlens array is provided on a surface of the second substrate the surface being opposite to a surface that faces the first substrate.

According to the present invention, there is provided a liquid crystal panel comprising:

a first substrate including a plurality of pixel electrodes;

a second substrate including a counter electrode;

a liquid crystal;

a plurality of gap holding members; and a microlens array including a plurality of microlenses, characterized in that:

the first substrate faces the second substrate through the plurality of pixel electrodes, the counter electrode, the liquid crystal, and the plurality of gap holding members; and the microlens array is provided on a surface of the first substrate, the surface being opposite to a surface that faces the second substrate.

According to the present invention, there is provided a liquid crystal panel comprising:

a first substrate including a plurality of thin film transistors and a plurality of pixel electrodes;

a second substrate including a counter electrode;

a liquid crystal;

a plurality of gap holding members; and a microlens array including a plurality of microlenses, characterized in that:

the first substrate faces the second substrate through the plurality of thin film transistors, the plurality of pixel electrodes, the counter electrode, the liquid crystal, and the plurality of gap holding members; and the microlens array is provided in the first substrate at a side opposite to the second substrate.

According to the present invention, there is provided a liquid crystal panel comprising:

a first substrate including a plurality of thin film transistors and a plurality of pixel electrodes;

a second substrate including a counter electrode;

a liquid crystal;

a plurality of gap holding members; and a microlens array including a plurality of microlenses, characterized in that:

the first substrate faces the second substrate through the plurality of thin film transistors, the plurality of pixel electrodes, the counter electrode, the liquid crystal, and the plurality of gap holdings members; and the microlens array is provided in the second substrate at a side opposite to the first substrate.

According to the present invention, there is provided a liquid crystal panel comprising:

a first substrate including a plurality of thin film transistors and a plurality of pixel electrodes;

a second substrate including a counter electrode:

a liquid crystal;

a plurality of gap holding members; and a microlens array including a plurality of microlenses, characterized in that:

the plurality of thin film transistors control potentials applied to the plurality of pixel electrodes;

the first substrate faces the second substrate through the plurality of thin film transistors, the plurality of pixel electrodes, the counter electrode, the liquid crystal, and the plurality of gap holding members; and the microlens array is provided on a surface of the second substrate, the surface being opposite to a surface that faces the first substrate; and the plurality of microlenses are provided on one-on-one basis with respect to the plurality of pixels.

According to the present invention, there is provided a liquid crystal panel comprising:

a first substrate including a plurality of thin film transistors and a plurality of pixel electrodes;

a second substrate including a counter electrode;

a liquid crystal;

a plurality of gap holding members; and a microlens array including a plurality of microlenses, characterized in that:

the plurality of thin film transistors control potentials applied to the plurality of pixel electrodes;

the first substrate faces the second substrate through the plurality of thin film transistors, the plurality of pixel electrodes, the counter electrode, the liquid crystal, and the plurality of gap holding members;

the microlens array is provided on a surface of the first substrate, the surface being opposite to a surface that faces the second substrate; and the plurality of microlenses are provided on one-on-one basis with respect to the plurality of pixels.

According to the present invention, there is provided a liquid crystal projector comprising:

a white light source;

splitting means for splitting white light emitted from the white light source into a plurality of lights having different colors;

a plurality of liquid crystal panels respectively corresponding to the plurality of lights;

first optical means for irradiating the plurality of lights to the plurality of corresponding liquid crystal panels; and second optical means for condensing a plurality of transmitted lights transmitted through the plurality of liquid crystal panels, characterized in that:

at least one of the plurality of liquid crystal panels includes a first substrate and a second substrate;

the plurality of lights are irradiated from a side of the second substrate to the liquid crystal panel;

a plurality of gap holding members are provided between the first substrate and the second substrate; and a microlens array is provided at a side of the second substrate where the plurality of lights are irradiated.

According to the present invention, there is provided a liquid crystal projector comprising:

a white light source;

splitting means for splitting white light emitted from the white light source into a plurality of lights having different colors;

a plurality of liquid crystal panels respectively corresponding to the plurality of lights;

first optical means for irradiating the plurality of lights to the plurality of corresponding liquid crystal panels; and second optical means for condensing a plurality of transmitted lights transmitted through the plurality of liquid crystal panels, characterized in that:

at least one of the plurality of liquid crystal panels includes a first substrate and a second substrate;

the plurality of lights are irradiated from a side of the second substrate to the liquid crystal panel;

a plurality of pixels are provided on the first substrate;

each of the plurality of pixels includes a pixel electrode and a thin film transistor connected to the pixel electrode;

a plurality of gap holding members are provided between the first substrate and the second substrate;

a microlens array is provided at a side of the second substrate where the plurality of lights are irradiated; and a plurality of microlenses included in the microlens array are provided on one-on-one basis with respect to the plurality of pixels.

According to the present invention, there is provided a liquid crystal projector comprising:

a white light source;

splitting means for splitting white light emitted from the white light source into a plurality of lights having different colors;

a plurality of liquid crystal panels respectively corresponding to the plurality of lights;

first optical means for irradiating the plurality of lights to the plurality of corresponding liquid crystal panels; and second optical means for condensing a plurality of transmitted lights transmitted through the plurality of liquid crystal panels, characterized in that:

at least one of the plurality of liquid crystal panels includes a first substrate and a second substrate;

the plurality of lights are irradiated from a side of the second substrate to the liquid crystal panel;

a pixel portion including a plurality of pixels is provided on the first substrate;

each of the plurality of pixels includes a pixel electrode and a thin film transistor connected to the pixel electrode;

a plurality of gap holding members are provided between the pixel portion and the second substrate;

a microlens array is provided at a side of the second substrate where the plurality of lights are irradiated; and a plurality of microlenses included in the microlens array are provided on one-on-one basis with respect to the plurality of pixels.

The present invention may be characterized in that each of the plurality of thin film transistors includes a semiconductor film including a source region, a drain region and a channel formation region, the source regions or the drain regions of the respective thin film transistors are connected to the plurality of pixel electrodes at the contact portions, and the plurality of gap holding members are provided over the contact portions.

The present invention may be characterized in that the plurality of gap holding members have respectively a circular column shape.

The present invention may be characterized in that the plurality of gap holding members have respectively an elliptical column shape.

The present invention may be characterized in that the plurality of gap holding members have respectively a polygonal column shape.

The present invention may be characterized in that the sides of the plurality of gap holding members are respectively taper-shaped.

The present invention may be characterized in that the plurality of gap holding members respectively include a material selected from the group consisting of polyimide, acryl, polyamide, polyimidoamide, and epoxy resin.

The present invention may be characterized in that the plurality of gap holding members respectively include a material selected from the group consisting of an ultraviolet ray curing resin and a thermosetting resin.

The present invention may be characterized in that the liquid crystal panel sizes diagonally 1 inch or less.

The present invention may be characterized in that the plurality of gap holding members are provided at regions outside of effective light flux condensed regions of the microlenses, that is, regions where illumination becomes 1/10 or less of the peak illumination of condensed light of the microlens.

The present invention may be characterized in that the plurality of gap holding members are provided at regions outside of effective light flux condensed regions of the microlenses, that is, regions where illumination becomes 1/20 or less of the peak illumination of condensed light of the microlens.

DETAILED DESCRIPTION OF THE PREFERRED EMBODIMENTS

First, an embodiment mode of the present invention will be described with reference to FIGS. 1A to 8.

Figure 1A:
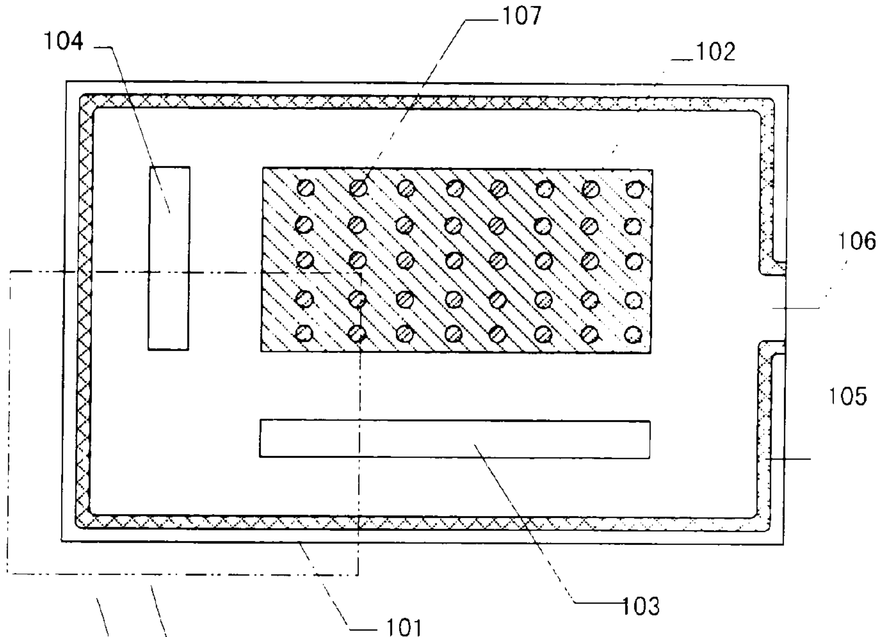
FIGS. 1A and 1B are schematic views of a TFT substrate of the present invention.
Figure 1B:
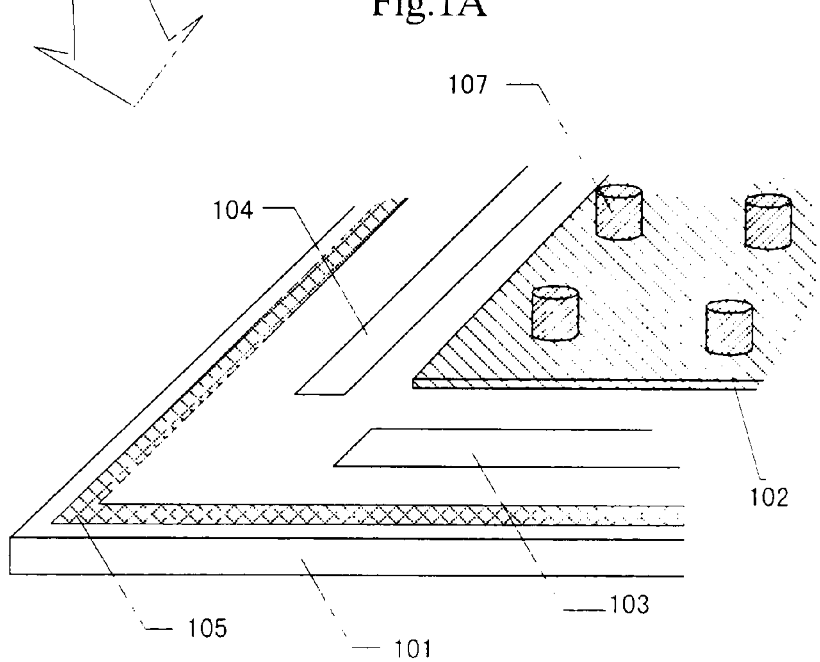

FIGS. 1A and 1B are schematic views of a TFT substrate of a liquid crystal panel included in a liquid crystal projector of the present invention. FIG. 1B is an enlarged view showing a part of the TFT substrate shown in FIG. 1A.

A source signal line driving circuit 103, a gate signal line driving circuit 104, and a pixel portion 102 are provided on a TFT substrate 101 as shown in the drawing. A seal member 105 is provided at the periphery of the TFT substrate 101, and a liquid crystal is injected through a liquid crystal injection port 106. Gap holding members 107 are provided on the pixel portion 102.

In this embodiment mode, although the gap holding members are provided only on the pixel portion, a position where the gap holding members are disposed is not limited to only the pixel portion.

Figure 2:
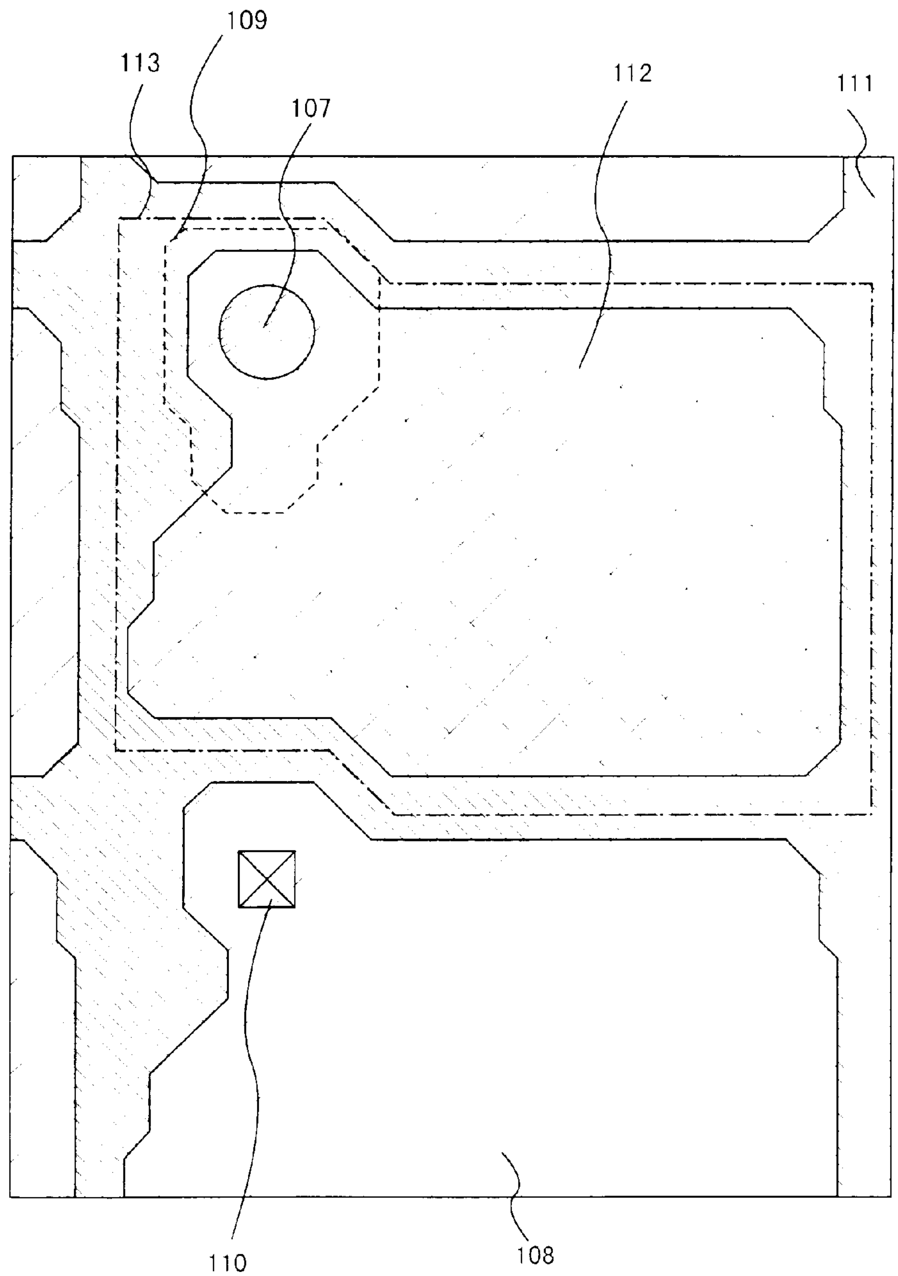
FIG. 2 is a schematic view of a pixel of the present invention.

FIG. 2 is an enlarged view of a pixel in which the gap holding member is provided. A pixel electrode 108 is provided in a pixel 113. A black matrix 111 is provided on a wiring and a pixel TFT (both are not shown). The gap holding member 107 is provided over a contact portion 110 where the pixel electrode 108 is connected to a drain wiring 109 provided under the pixel electrode 108.

The contact portion 110 between the pixel electrode 108 and the drain wiring, 109 is not positioned at an opening portion 112 of the pixel 113, in other words, a region which is used for an actual display and through which visible light is transmitted.

The opening portion 112 is a region through which the visible light is transmitted, and indicates a part of a region surrounded by the black matrix 111, which does not include a region where an obstacle to the visible light, such as the drain wiring 109, is provided.

Since the gap holding member 107 is distant from the region (opening portion 112) through which the visible light is transmitted to such a degree that the orientation of the liquid crystal material is not disturbed, a disturbance (disclination) of an image display is not easily produced.

In the case of FIG. 2, the mechanical strength of the liquid crystal panel is raised in structure, and even if a thin gap holding member is used, a deficiency is not easily produced by rubbing.

The arrangement of gap holding members in the pixel portion will be described with reference to FIGS. 3 and 4.

Figure 3:
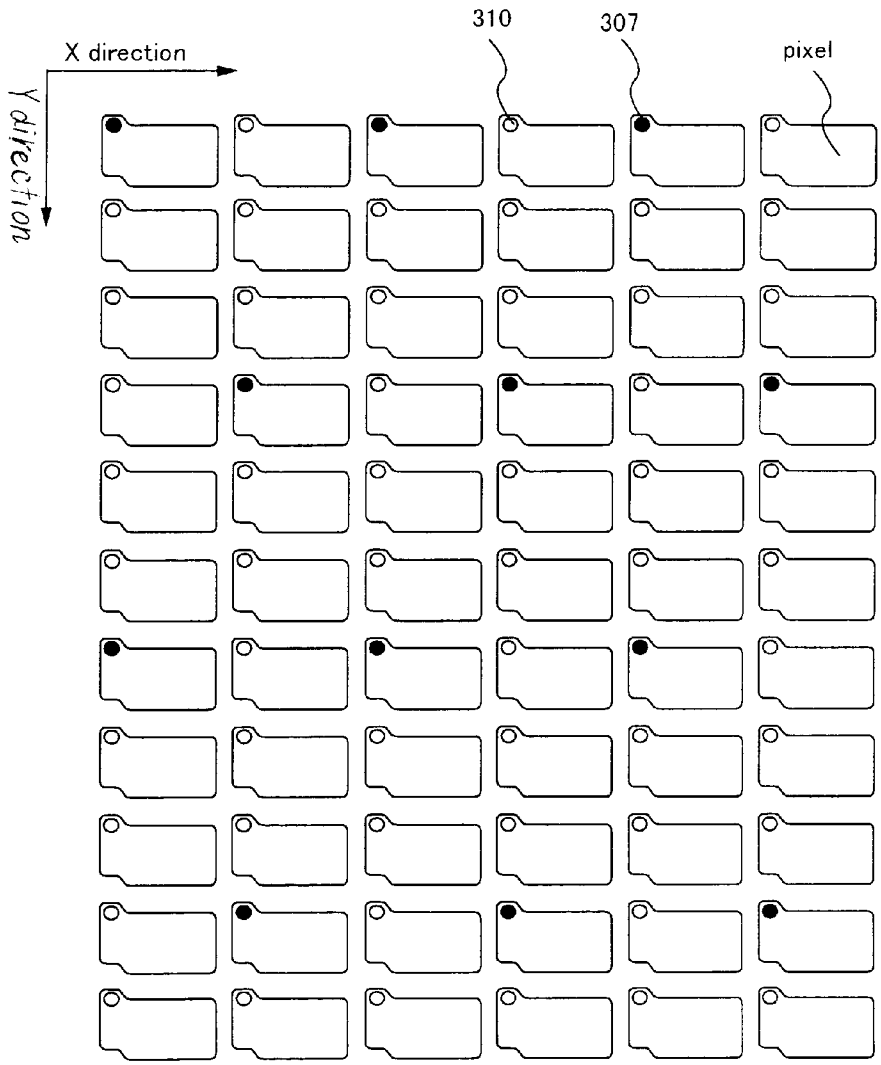
FIG. 3 is an enlarged view of a pixel portion of the present invention.

In FIG. 3, a gap holding member 307 is denoted by a black circle, and a contact portion 310 where the gap holding member is not formed is denoted by a white circle. A direction in which a source signal line is provided is defined as an X direction, and a direction in which a gate signal line is provided is defined as a Y direction. For the purpose of forming a triangle resembling a regular triangle as far as possible by the gap holding members positioned nearest to one another, the gap holding member 307 is provided every sixth pixel provided in the Y direction. Besides, the gap holding member 307 is provided every second pixel provided in the X direction.

By making such an arrangement, the gap holding members can be scattered at a constant period in the pixel portion. Thus, the cell gap can be made more uniform.

An arrangement of the gap holding members, different from FIG. 3, will be described with reference to FIG. 4.

Figure 4:
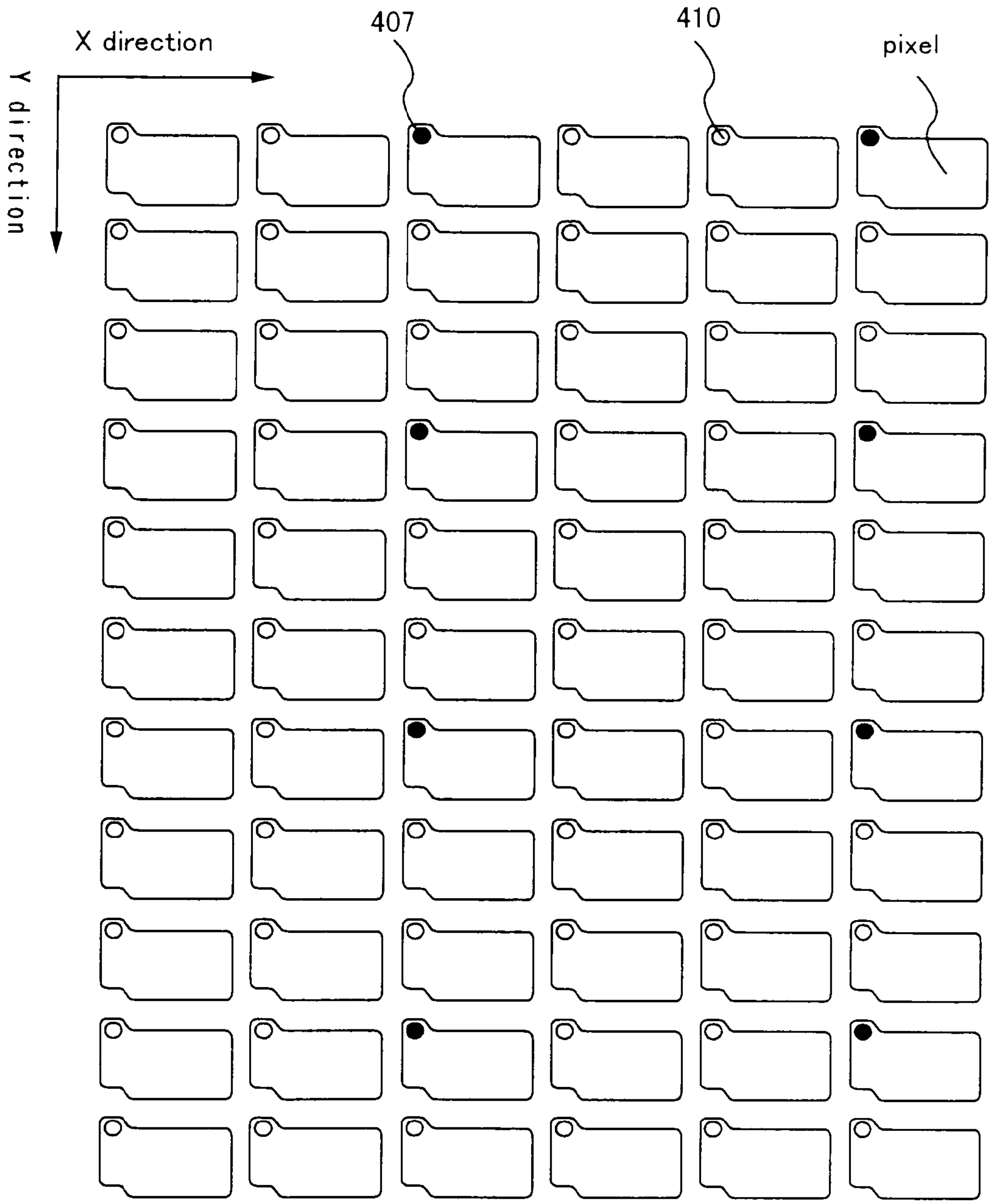
FIG. 4 is an enlarged view of a pixel portion of the present invention.

In FIG. 4, similarly to FIG. 3, a gap holding member 407 is indicated by a black circle, and a contact region 410 of a pixel where the gap holding member 407 is not formed is indicated by a white circle. A direction in which a source signal line is provided is defined as an X direction, and a direction in which a gate signal line is provided is defined as a Y direction. The gap holding member 407 is provided every third pixel provided in the Y direction. Besides, the gap holding member 407 is provided every third pixel provided in the X direction.

By making such arrangement, the gap holding members are scattered at a constant period in the pixel portion. Thus, the cell gap can be made uniform.

Incidentally, in this embodiment mode, although the two ways of arranging the gap holding members have been described, the present invention is not limited to this mode. In the present invention, the formation positions of the gap holding members and the number thereof may be determined so that the cell gap can be held and the display is not prevented.

A microlens array used in the present invention will be described with reference to FIG. 5 and FIGS. 6A and 6B.

Figure 5:
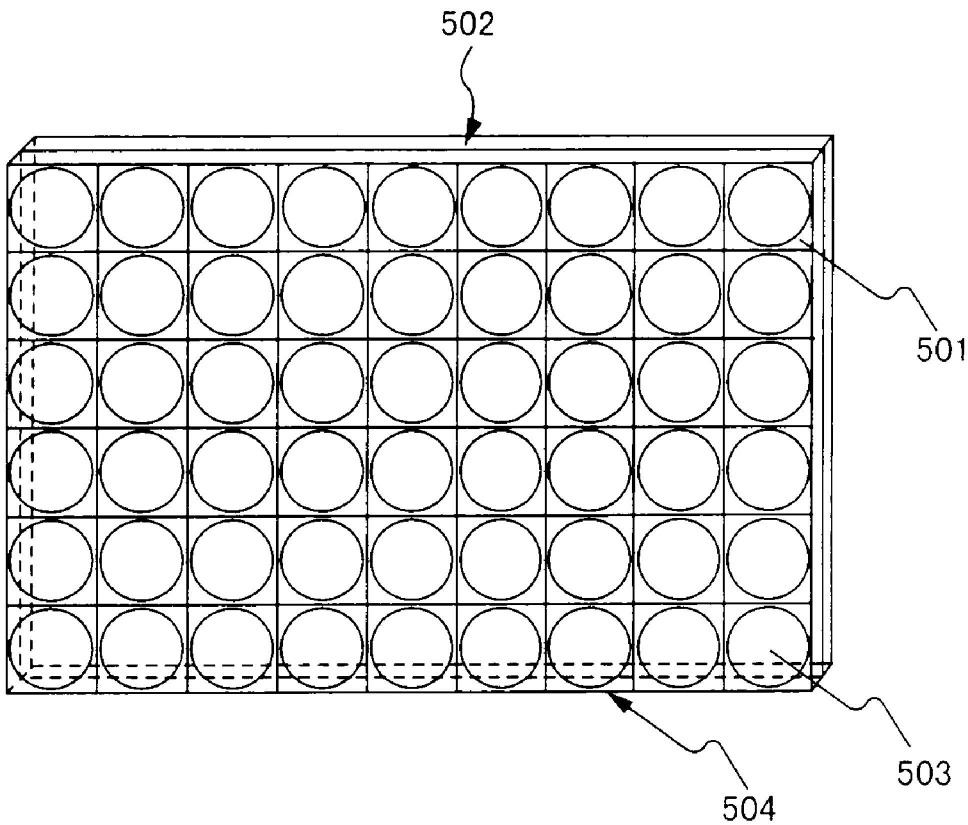
FIG. 5 is a view of a microlens array used in the present invention.

A microlens array 504 including a plurality of microlenses 503 is provided on a liquid crystal panel 502 as shown in FIG. 5. Pixels 501 are arranged in stripe form, and one of the microlenses 503 is provided to correspond to one of the pixels 501.

Each of the microlenses 503 has almost the same shape, and has a shape obtained by cutting off a part of a sphere.

The microlens array 504 is provided at a side of a counter substrate of a liquid crystal panel, and may be in close contact with the counter substrate or may be depart therefrom.

Another microlens array different from that of FIG. 5 will be described with reference to FIGS. 6A and 6B.

Figure 6A:
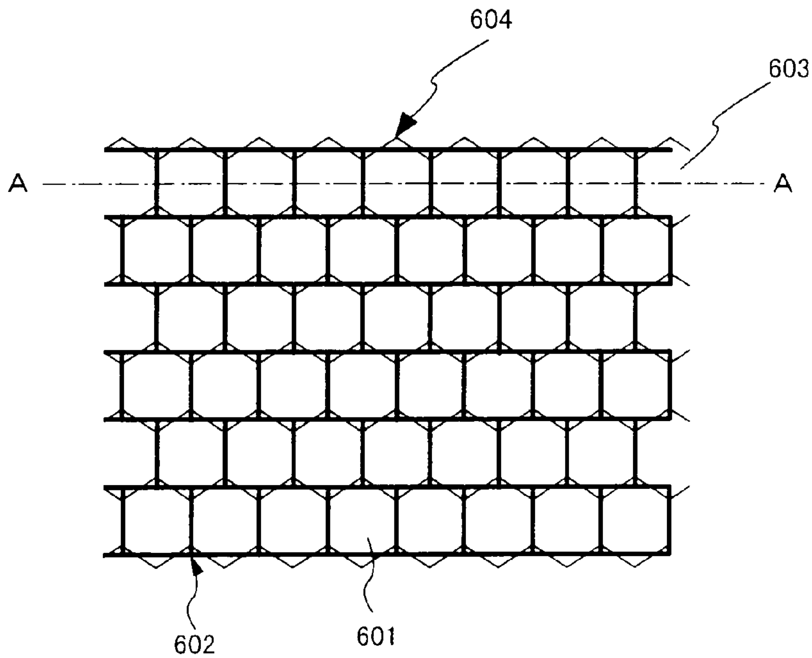
FIGS. 6A and 6B are views of a microlens array used in the present invention.
Figure 6B:
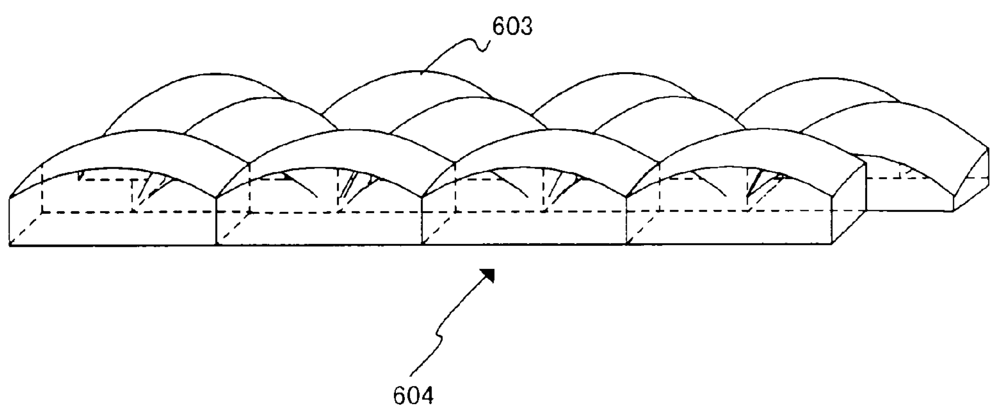

FIG. 6A is a top view of a liquid crystal panel 602, and FIG. 6B is a perspective view of a microlens array 604 of FIG. 6A. The microlens array 604 includes a plurality of microlenses 603 each being hexagonal when viewed from a light incident side. The microlenses 603 are provided on one-on-one basis with respect to pixels 601 of delta arrangement included in the liquid crystal panel 602.

In the case where the microlenses 603 are respectively hexagonal, since a gap does not exist between the microlenses 603, as compared with round microlenses, it is possible to more effectively condense light to a pixel.

The shape of the microlens can be controlled by a manufacturing process. The forgoing microlens 603 can be manufactured by an ion exchange method (for example, Appl. Optics. 21(6) p. 1052 (1984), Electron Lett. 17 p. 45 (1981)), a method using photopolymerization polymer (for example, Suzulki et al., "New Manufacturing Method of Plastic Microlens", the 24th micro-optics workshop), a method of forming a lens through surface tension by heating photoresist (for example. Zoran D. Popovic et al., Appl. Optics. 27 p. 1281 (1988)), an evaporation method (for example. Japanese Patent Application Laid-open No. Sho 61-64158), a mechanical working method, a method disclosed in Japanese Patent Application Laid-open No. Hei 3-248125, or the like.

Incidentally, the present invention is not limited to the microlens arrays shown in FIG. 5 and FIGS. 6A and 6B. The present invention can use any microlens array as long as one microlens is provided for one pixel of a pixel portion.

Besides, in FIG. 5 and FIGS. 6A and 6B, although the description has been made on the structure in which the microlens array is provided at the side of the counter substrate, the present invention is not limited to this structure. The microlens array may be provided at the side of the TFT substrate.

Figure 7:
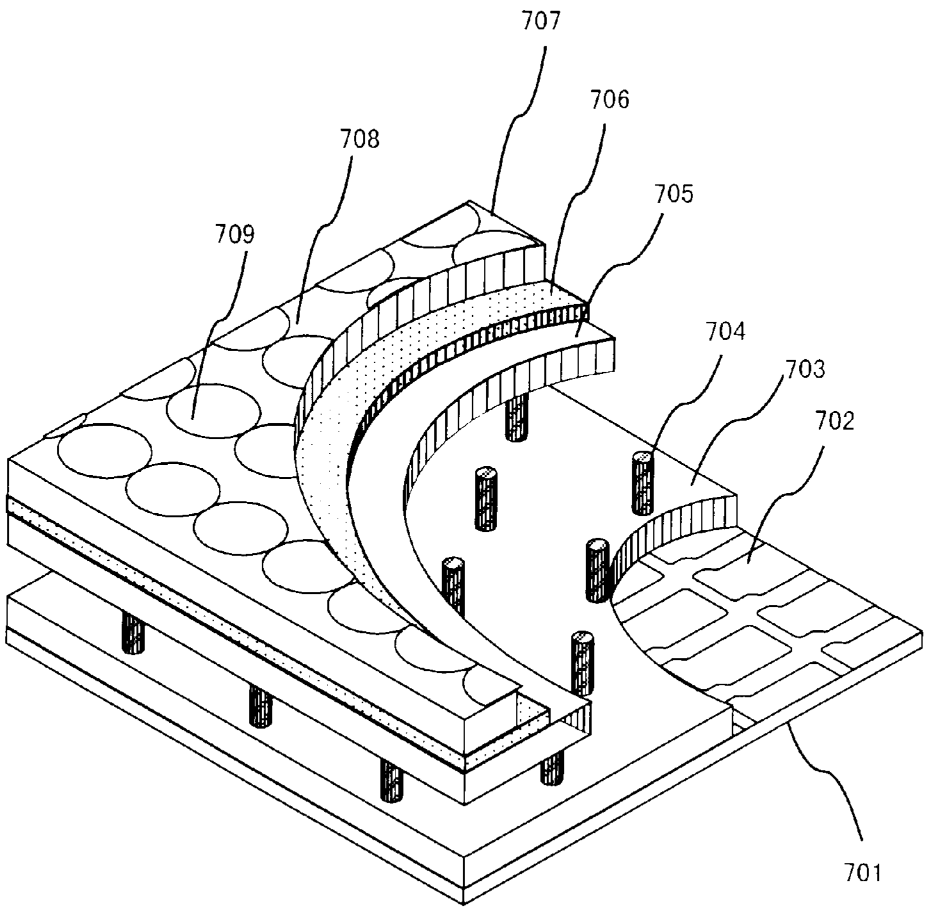
FIG. 7 is a perspective view of a section of a liquid crystal panel of the present invention.

FIG. 7 is a perspective view showing an outline structure of a liquid crystal panel of this embodiment mode.

A TFT substrate 701, a pixel 702, an orientation film 703, a gap holding member 704, an orientation film 705 for a counter substrate, a counter electrode 706, a counter substrate 707, and a microlens array 708 including a plurality of microlenses 709 are provided as shown in the drawing. A polarizing plate is omitted. Although the orientation films are provided on both the TFT substrate and the counter substrate, such a structure that the orientation film is provided on either one of the substrates may be adopted. The liquid crystal panel shown in FIG. 7 includes a liquid crystal (not shown) in addition to the gap holding member 704 between the orientation film 703 and the orientation film 705 for the counter substrate.

Incidentally, in FIG. 7, although the structure in which the microlens array 708 is provided at the side of the counter substrate 707 is shown, the present invention is not limited to this structure. The microlens array 708 may be provided at the side of the TFT substrate 701.

FIGS. 8A, 8B, 8C and 8D show three-plate type liquid crystal projectors including the liquid crystal panel shown in FIG. 7.

Figure 8A:
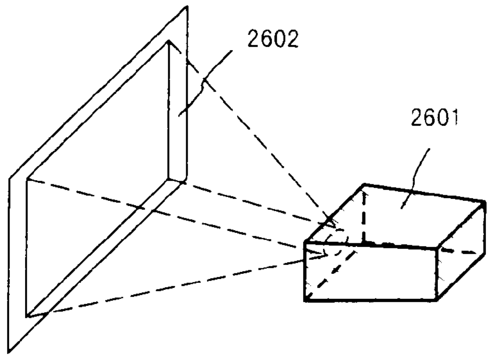
FIGS. 8A to 8D are views of a three-plate type liquid crystal projector including a liquid crystal panel of the present invention.

FIG. 8A shows a front type projector, which is constituted of a light source optical system and liquid crystal panel 2601, and a screen 2602.

Figure 8B:
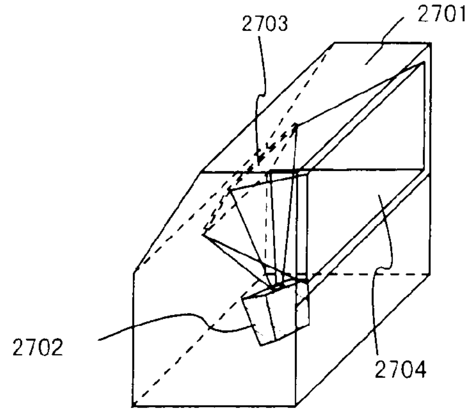

FIG. 8B shows a rear type projector, which is constituted of a main body 2701, a light source optical system and liquid crystal panel 2702, a mirror 2703, and a screen 2704.

Figure 8C:
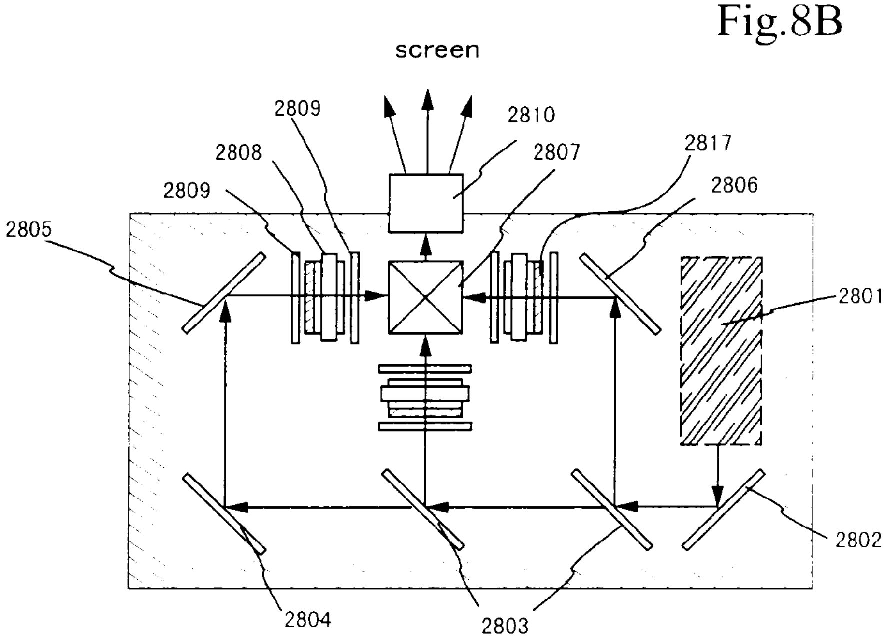

FIG. 8C is a view showing an example of the structure of the light source optical system and liquid crystal panel 2601 or 2702 in FIG. 8A or 8B. The light source optical system and liquid crystal panel 2601 or 2702 is constituted of a light source optical system 2801, mirrors 2802 and 2804 to 2806, dichroic mirrors 2803, an optical system 2807, a liquid crystal panel 2808, a phase difference plate 2809, a projection optical system 2810, and a microlens array 2817. The projection optical system 2810 is constituted of a plurality of optical lenses provided with a projection lens.

The microlens array 2817 is provided at the side of each of the three liquid crystal panels 2808 where light enters.

An operator may suitably provide an optical lens, a film having a polarizing function, a film for adjusting a phase difference, an IR film, or the like in a light path indicated by an arrow in FIG. 8C.

Figure 8D:
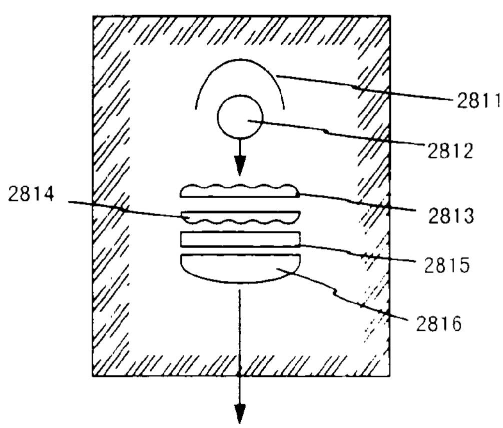

Besides, FIG. 8D is a view showing an example of a structure of the light source optical system 2801 in FIG. 8C. In this mode, the light source optical system 2801 is constituted of a reflector 2811, a light source 2812, lens arrays 2813 and 2814, a polarizing conversion element 2815, and a condensing lens 2816. Incidentally, the light source optical system shown in FIG. 8D is an example, and the invention is not limited to this. For example, the operator may suitably provide an optical lens, a film having a polarizing function, a film for adjusting a phase difference, an IR film, or the like in the light source optical system.

In the present invention, the liquid crystal and the gap holding members are provided between the TFT substrate including the pixel portion and the counter substrate including the counter electrode, and the microlens array is provided at the side of the liquid crystal panel where light enters, that is, the side of the counter substrate.

According to the foregoing structure, in the present invention, the spacer can be disposed at a desired position. The cell gap can be controlled more uniformly than the case where the spherical spacer is used.

It is preferable that the gap holding member is formed over the contact portion between the pixel electrode of the pixel and the wiring (drain wiring) connected to the drain region of the pixel TFT. The contact portion between the pixel electrode and the drain wiring is not positioned at the opening portion (region through which visible light is transmitted) of the pixel. Besides, since the contact portion is distant from the region through which the visible light is transmitted to such a degree that the orientation of the liquid crystal material is not disturbed, the disturbance (disclination) of the image display is not easily produced. Although it is preferable that the gap holding member is provided over the contact portion, the present invention is not limited to this. It is important that the gap holding member is provided at a position where the display image is not disturbed.

Since it becomes possible, by the gap holding members, to uniformly control two substrates of the liquid crystal panel to have the cell gap of a desired value, even if the focal depth becomes shallow by making the microlens array minute, it becomes possible to suppress the deterioration in the display quality of the liquid crystal projector due to uneven display or uneven brightness.

In the present invention, according to the above structure, it becomes possible to raise the brightness of an image without raising the brightness of a light source, and the liquid crystal project can be made thin and lightweight, and at the same time, high fineness, high quality, and high brightness can be achieved.

The present invention is effective especially in a small liquid crystal panel with a substrate sizing diagonally 1 inch or less.

Incidentally, the liquid crystal panel of the present invention can also be used for a goggle type display device (head mount display). In this case, it is necessary to form color filters in such a manner that pixels included in the pixel portion are respectively made to correspond to R, G and B.

Hereinafter, embodiments of the present invention will be described with reference to FIGS. 9A to 13 and FIGS. 19A to 27.

Embodiment 1

In this embodiment, a method of fabricating gap holding members on a TFT substrate will be described with reference to FIGS. 9A to 9D.

Figure 9A:
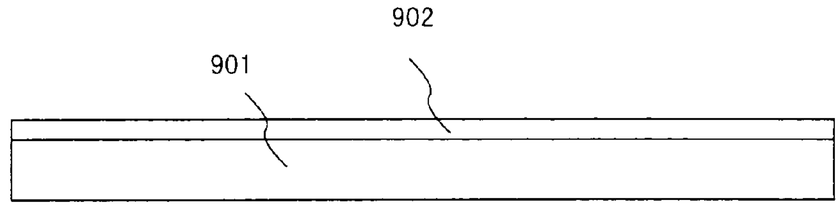
FIGS. 9A to 9D are views of a fabricating process of gap holding members.

FIG. 9A shows a state in which a pixel portion (not shown) has been formed on a TFT substrate 901, an orientation film 902 has been formed on the pixel portion, and a rubbing treatment has been carried out to the orientation film 902.

An insulating coating material which becomes gap holding members is applied onto the orientation film 902, so that an insulating coating 903 is formed. As the insulating coating material, a resin material having a specific gravity and thermal expansion coefficient close to a liquid crystal is preferable. For example, it is possible to use a resin material selected from the group consisting of polyimide, acryl, polyamide, polyimidoamide, and epoxy resin. Besides, it is possible to use an ultraviolet ray curing resin or thermosetting resin material which can be formed without exerting a large thermal influence on the substrate.

Figure 9B:
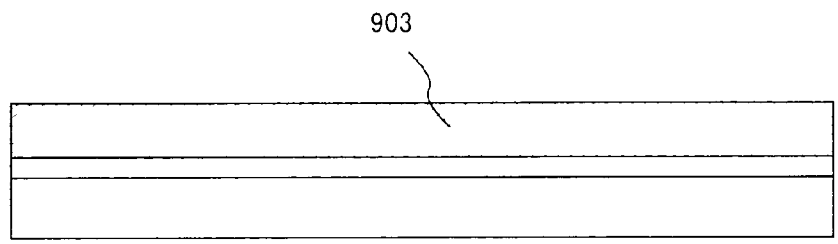

Application was made by a spin coating method under the condition of 900 rpm and 10 seconds. After the insulating coating 903 was formed, a heat treatment was carried out at 180 C for 60 minutes (FIG. 9B).

Figure 9C:
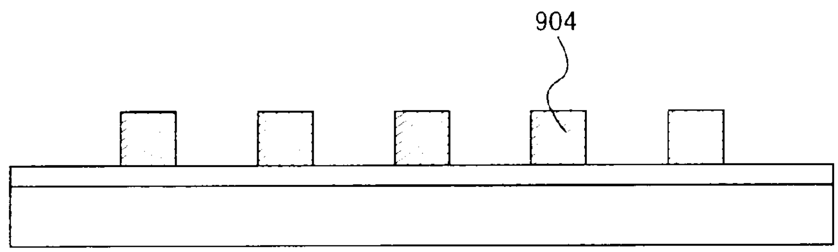
Figure 9D:
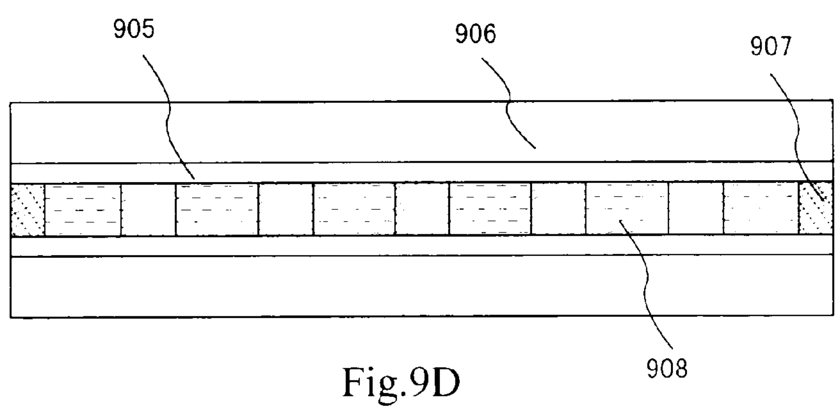

Next, the insulating coating 903 was patterned, and gap holding members 904 were formed. As a method of patterning the insulating coating 903, an etching method can be mentioned. As another patterning method, it is possible to use a method in which an insulating coating is formed with a photosensitive material, and patterning is made by exposure and development. Incidentally, the formation positions of the gap holding members 904 and the number thereof have only to be determined so that a cell gap can be held and a display is not prevented (FIG. 9C).

In this embodiment, the shape of the gap holding member was made cylindrical, the diameter of the cylinder was made 4 $\mu$m, and the height was made 3.2 $\mu$m. In this embodiment, the gap holding members 904 were disposed at random. The arrangement density of the gap holding members 904 may be made 30 to 160 pieces/mm$^2$. In this embodiment, the gap holding members 904 were disposed at 50 pieces/mm$^2$.

In this embodiment, although the shape of the gap holding member is made cylindrical, the shape of the gap holding member may be an elliptical shape, streamline shape, or polygonal shape such as a triangle or square. As long as the shape can control the cell gap between the TFT substrate 901 (first substrate) and a counter substrate 906 (second substrate), any shape may be adopted. Besides, in this embodiment, although all gap holding members have the same shape, gap holding members having plural kinds of shapes may be formed. Besides, in this embodiment, although the plurality of gap holding members are formed on the pixel portion in such a manner that the arrangement density becomes uniform, the gap holding members may be formed on the whole surface of the TFT substrate.

A seal member 907 is applied on the orientation film 902 so as to surround the periphery of the TFT substrate 901. Then, the counter substrate 906 including an orientation film 905 for a counter substrate and a counter electrode (not shown) is bonded to the TFT substrate 901.

Next, a liquid crystal as a display medium is injected through a liquid crystal injection port. Thus, such a state is obtained that a liquid crystal 908 is held between the TFT substrate 901 and the counter substrate 906. In this embodiment, since the shape of the gap holding member 904 is cylindrical, a flow resistance between the liquid crystal material and the surface of the gap holding member, which is generated at the time of injection of the liquid crystal material, is small. Thus, it was possible to inject the liquid crystal material uniformly over the whole surface of the substrate. Incidentally, it is preferable that the shape and the arrangement of the gap holding member 908 are such that this flow resistance becomes small.

Thereafter, a sealing agent (not shown) was applied onto the liquid crystal material injection port, and the sealing agent was hardened by irradiation of ultraviolet rays, so that the liquid crystal material was completely sealed in a cell.

Embodiment 2

In this embodiment, a three-plate type liquid crystal projector different from the liquid crystal projector discussed in the embodiment mode of the present invention will be described.

Figure 10:
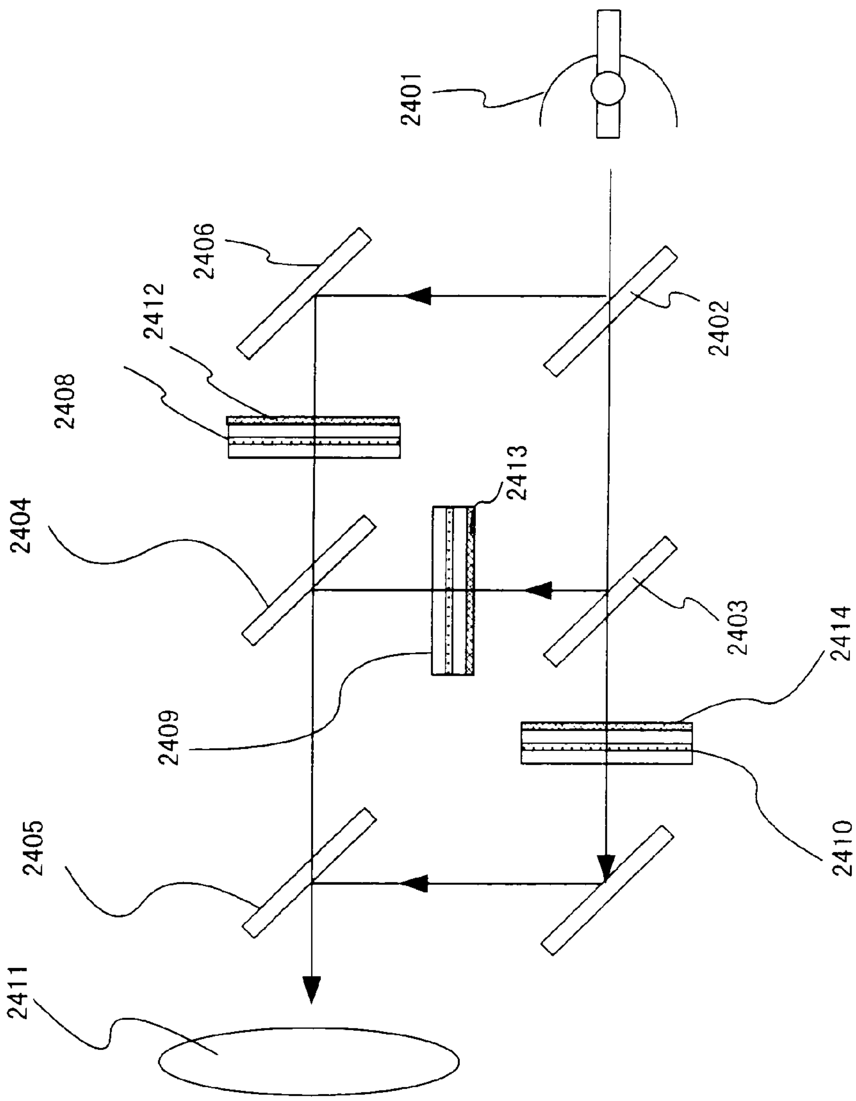
FIG. 10 is a view of a three-plate type liquid crystal projector including a liquid crystal panel of the present invention.

Reference will be made to FIG. 10. FIG. 10 is a structural view of an optical system of this three-plate type liquid crystal projector. Reference numeral 2401 designates a white light source made of a lamp and a reflector. White light having a spectrum of red, green and blue is emitted from the light source 2401. The light source 2401 is set so that the parallelism of the emitted white light becomes high. Besides, the reflector is used to effectively use the white light emitted from the lamp.

The white light emitted from the light source 2401 enter dichroic mirrors 2402 and 2403. These two dichroic mirrors 2402 and 2403 split the white light from the light source 2401 into lights (red, green, blue) of the three primary colors.

One of the lights of blue, red and green split by the dichroic mirrors 2402 and 2403 is reflected by a total reflection mirror 2406 and is irradiated to, and the remaining two are directly irradiated to corresponding liquid crystal panels 2408, 2409 and 2410, respectively. The liquid crystal panels 2408, 2409 and 2410 include microlens arrays 2412, 2413 and 2414 at the side where light enters.

The blue, red and green lights transmitted through the liquid crystal panels 2408, 2409 and 2410 are condensed into one by dichroic mirrors 2404 and 2405, and the condensed light is projected on a screen by a projection lens 2411.

Since a dichroic prism may not be used in the above structure, the price of the liquid crystal projector can be reduced.

Embodiment 3

In this embodiment, the arrangement of gap holding members different from that shown in FIG. 1 will be described.

Figure 11A:
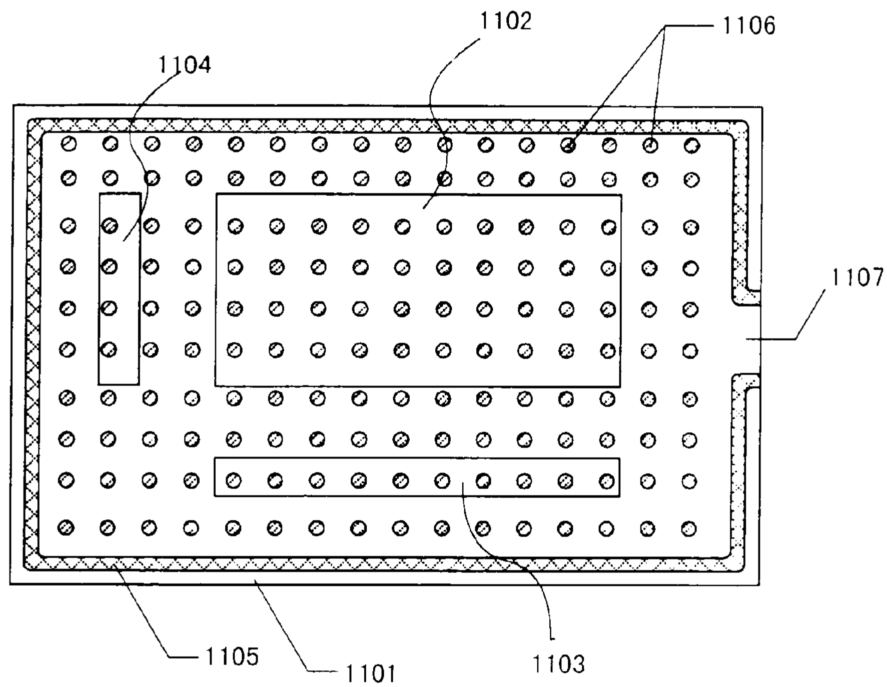
FIGS. 11A and 11B are top views of TFT substrates of the present invention.

FIG. 11A is a schematic view of a TFT substrate of a liquid crystal panel included in a liquid crystal projector of the present invention. A source signal line driving circuit 1103, a gate signal line driving circuit 1104, and a pixel portion 1102 are provided on a TFT substrate 1101 as shown in FIG. 11A. A seal member 1105 is provided at the periphery of the TFT substrate 1101 and a liquid crystal is injected through a liquid crystal injection port 1107. Gap holding members 1106 are provided on the whole surface of the TFT substrate 1101.

Since the gap holding member is an insulator, if the gap holding member is provided on a driving circuit including the source signal line driving circuit and the gate signal line driving circuit, a capacitance is formed and the operation of the driving circuit becomes slow.

However, in this case, as compared with the case where the gap holding members are formed only on the pixel portion 1102, the mechanical strength of the whole liquid crystal panel is increased, and the cell gap can be more uniformly held.

Figure 11B:
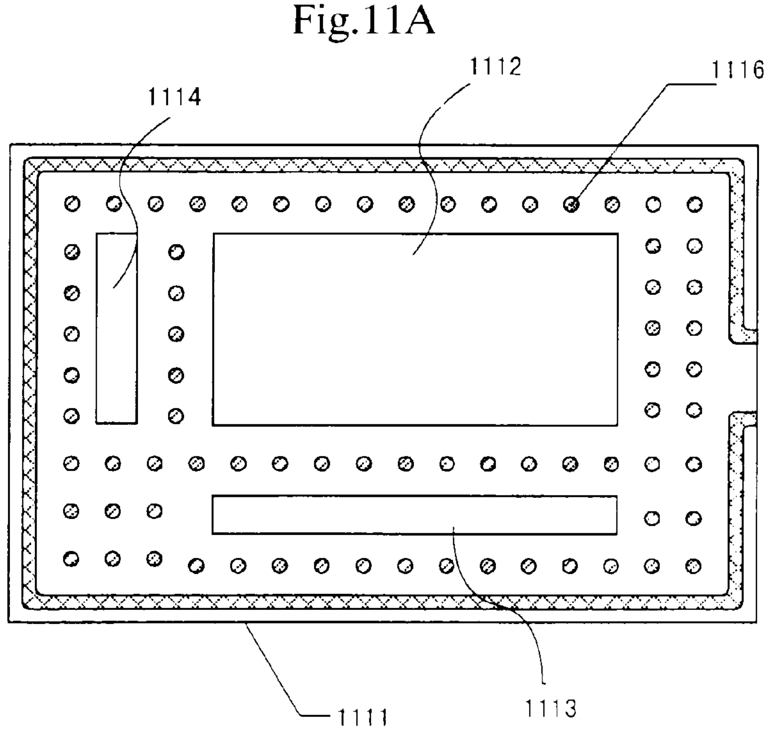

FIG. 11B is a schematic view of a TFT substrate of a liquid crystal panel included in a liquid crystal projector of the present invention. Gap holding members 1116 are provided in portions on a TFT substrate 1111 other than portions where a pixel portion 1112, a source signal line driving circuit 1113, and a gate signal line driving circuit 1114 are provided.

In this case, since the gap holding members are not provided on the pixel portion 1112, the precision in the positions of the gap holding members is not required unlike the case where the gap holding members are provided in the pixel portion, so that design and formation become easy.

Besides, since the gap holding members 1116 are not formed on the driving circuit including the source signal line driving circuit 1113 and the gate signal line driving circuit 1114, there does not occur such a state where a high speed operation of the driving circuit is prevented by formation of capacitance on the driving circuit.

Figure 12:
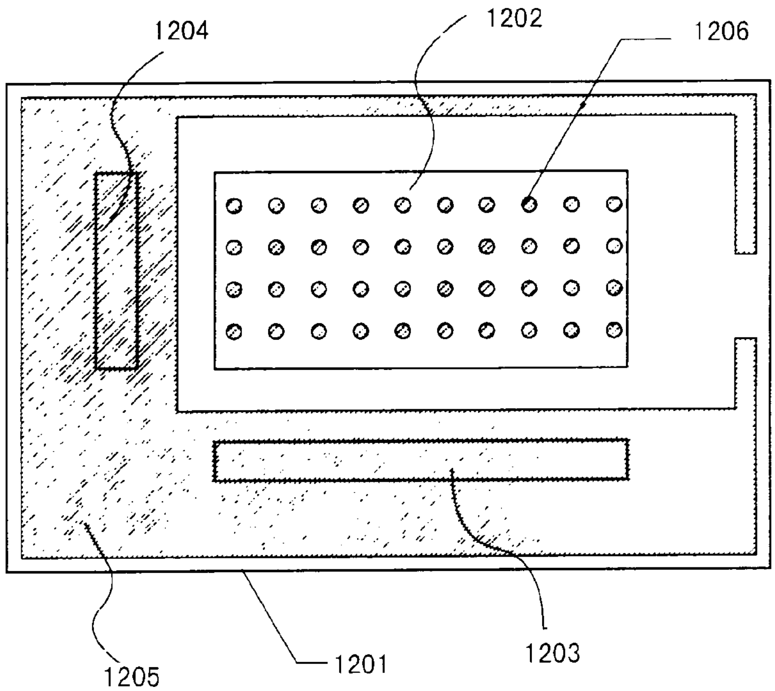
FIG. 12 is a top view of a TFT substrate of the present invention.

FIG. 12 is a schematic view of a TFT substrate of a liquid crystal panel included in a liquid crystal projector of the present invention. Gap holding members 1206 are provided on a pixel portion 1202 on a TFT substrate 1201. A protective film 1205 is provided so as to cover a source signal line driving circuit 1203 and a gate signal line driving circuit 1204 and so as to surround the pixel portion 1202.

Since the gap holding, member is an insulator, if the gap holding member is provided on a driving circuit including the source signal line driving circuit and the gate signal line driving circuit, a capacitance is formed and the operation of the driving circuit becomes slow.

However, the protective film 1205 serves also as a seal member, and it is possible to obtain an effect of raising the mechanical strength of the liquid crystal panel by covering the source signal line driving circuit 1203 and the gate signal line driving circuit 1204.

The protective film 1205 can also be formed at the same time as the gap holding members 1206. In this case, since it becomes unnecessary to newly form a seal member, the number of steps can be reduced.

The present invention is not limited to this embodiment. The formation positions of the gap holding members 1206 and the number thereof have only to be determined so that the cell gap can be held and the display is not prevented.

Embodiment 4

In this embodiment, a method of driving a liquid crystal panel used in the present invention will be described.

Figure 13:
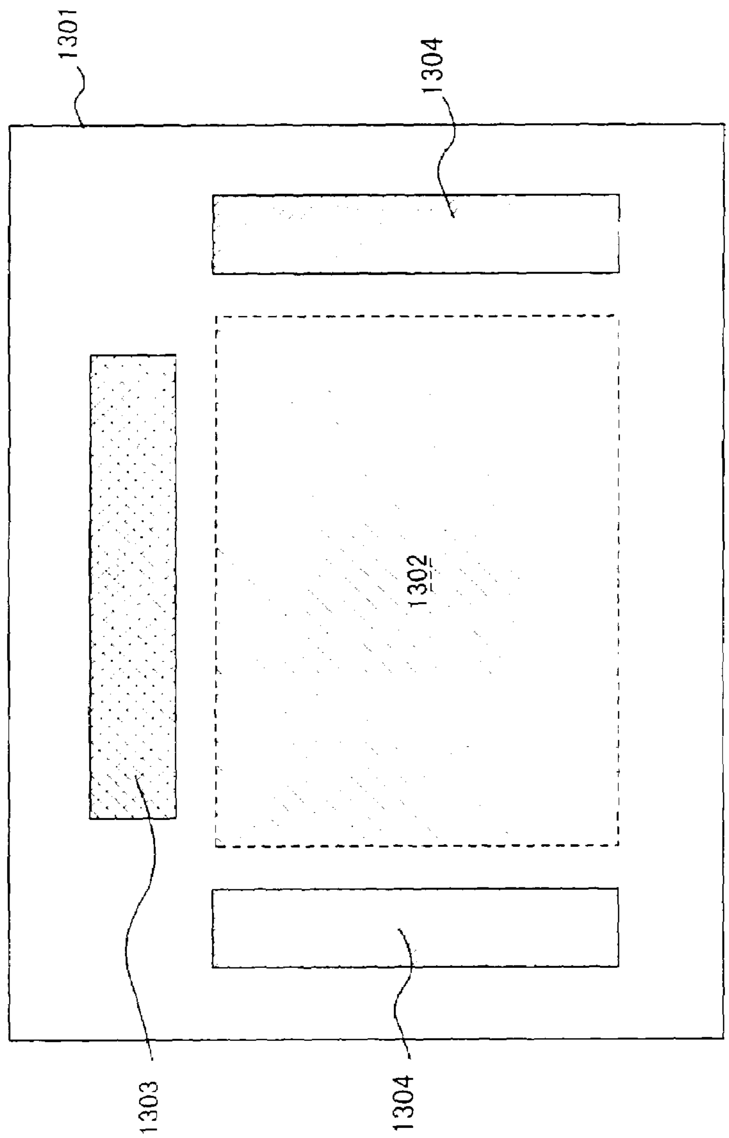
FIG. 13 is a block diagram of a TFT substrate.
Figure 14:
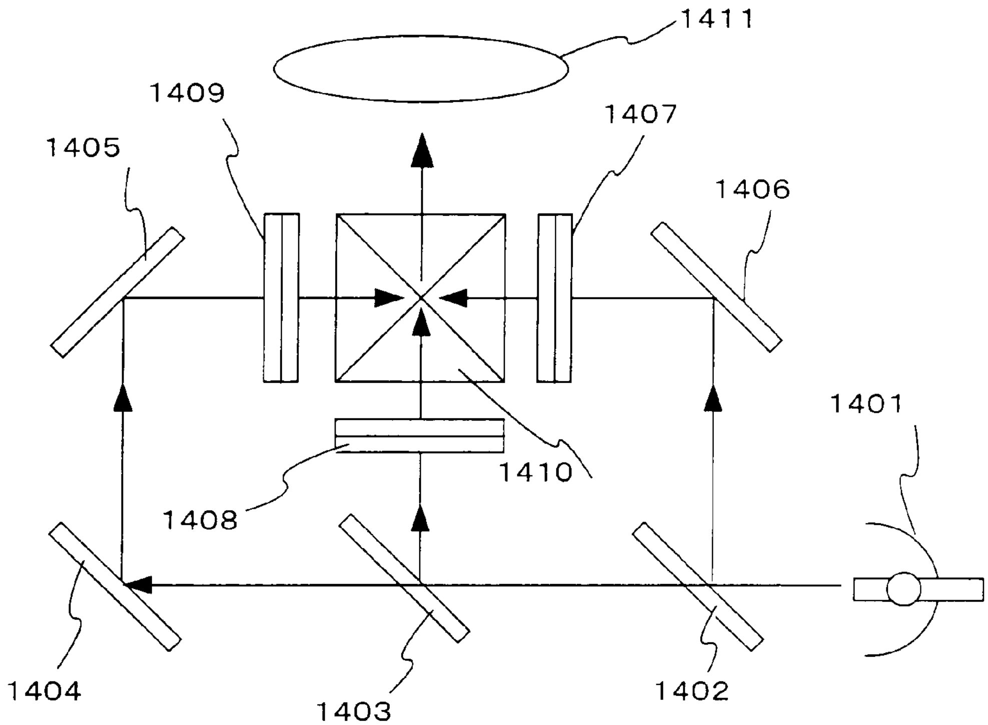
FIG. 14 is a view of a three-plate type liquid crystal projector using a conventional liquid crystal panel.
Figure 15:
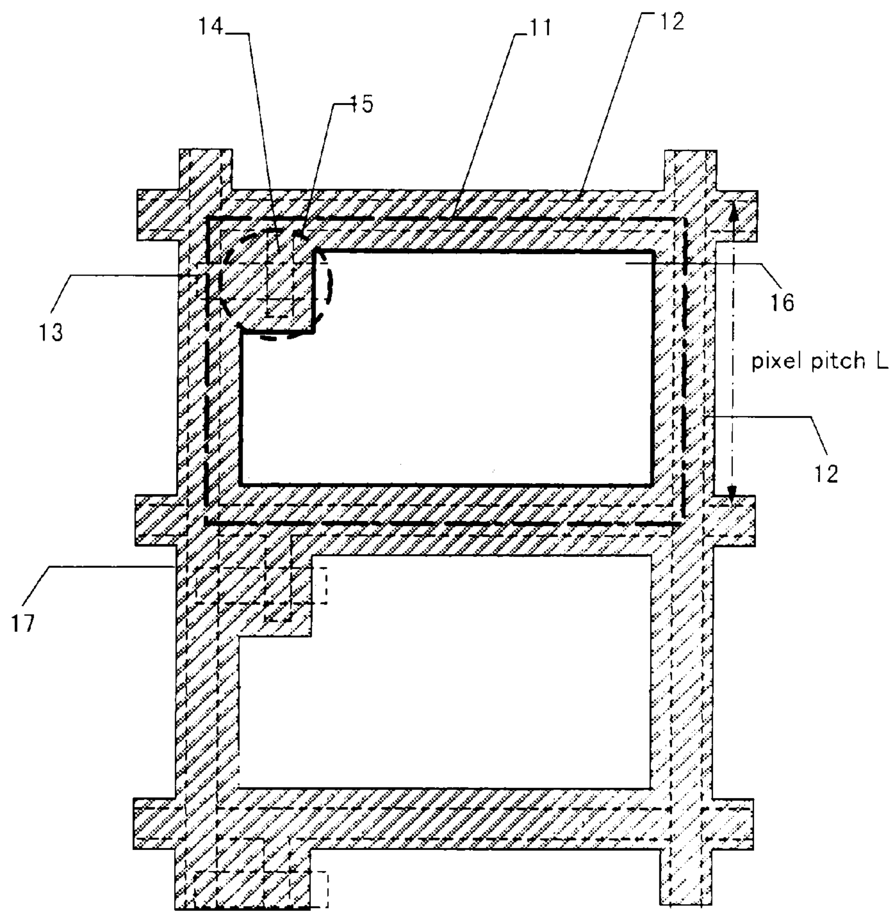
FIG. 15 is an enlarged view of a pixel of a liquid crystal panel.
Figure 16:
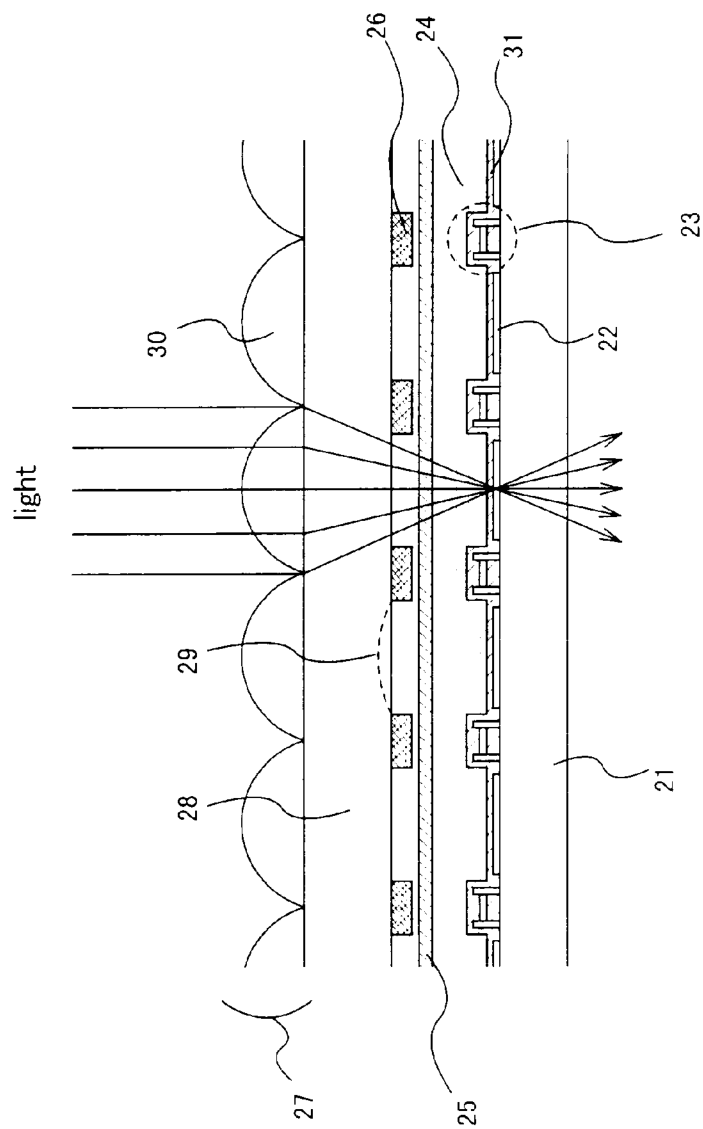
FIG. 16 is a sectional view of a liquid crystal panel including a microlens array.
Figure 17:
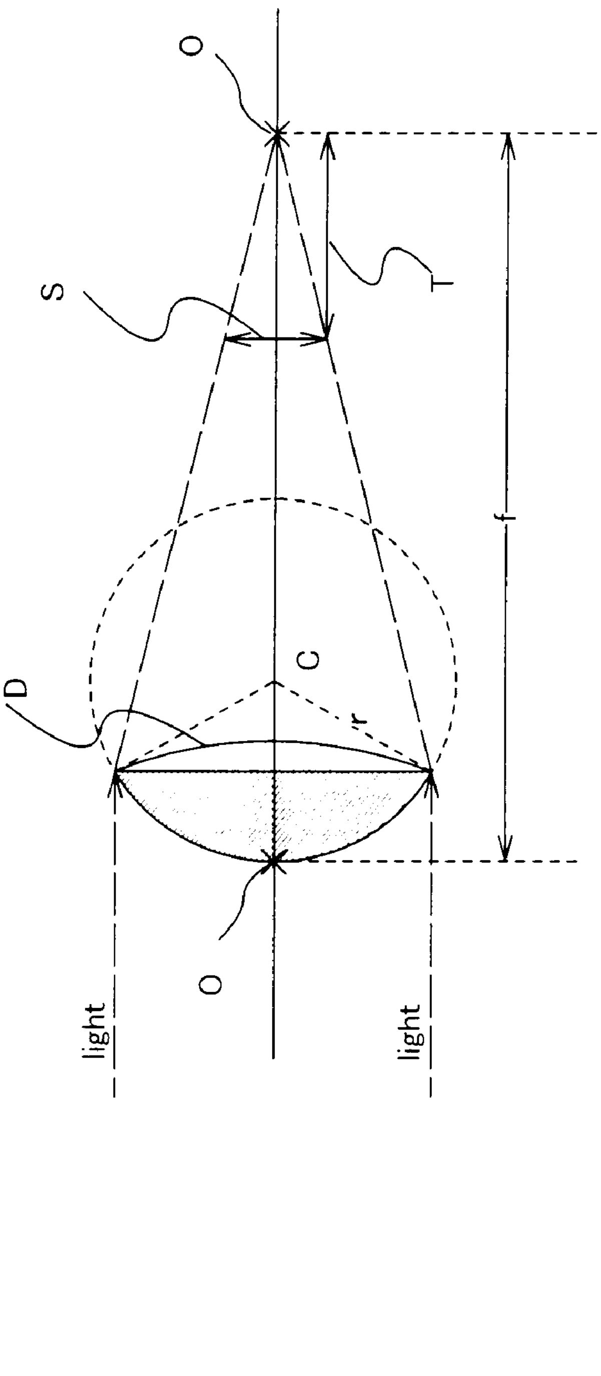
FIG. 17 is a sectional view of a microlens.
Figure 18:
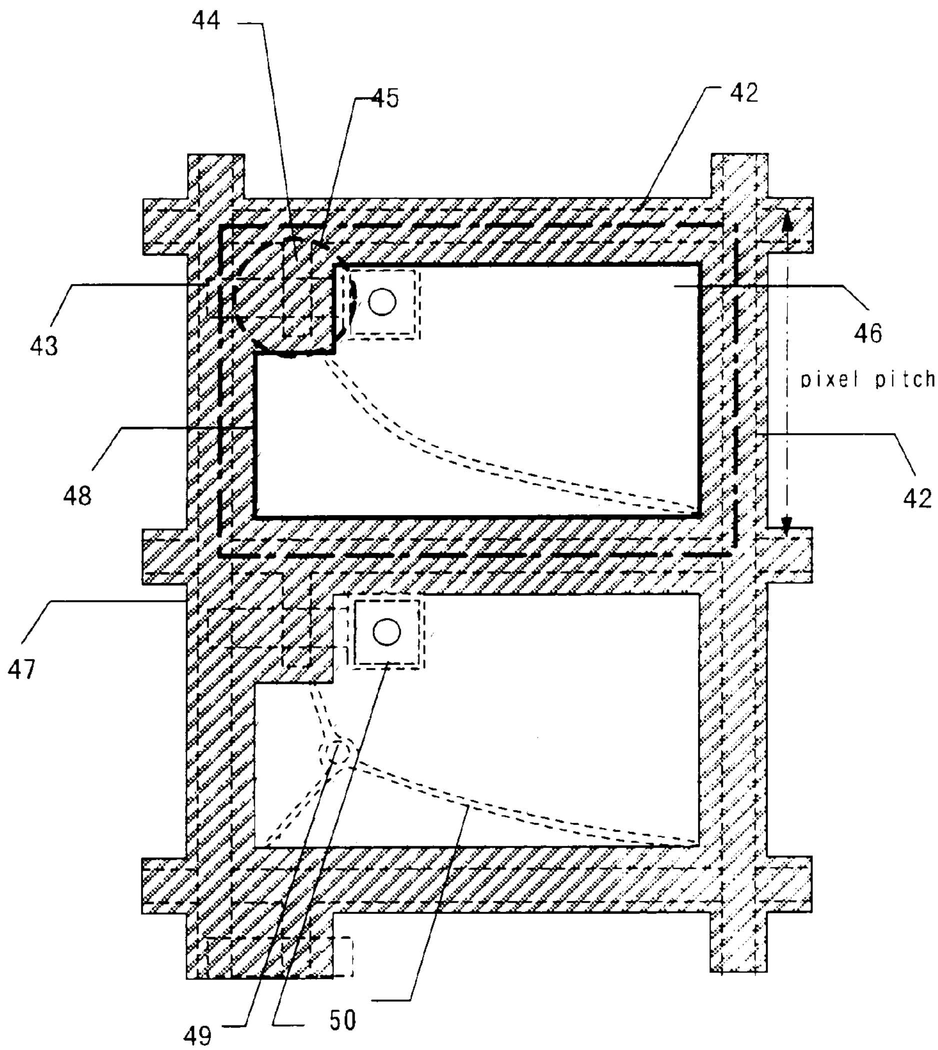
FIG. 18 is a view for explaining disclination in a pixel.

FIG. 13 is a top view of an active matrix type liquid crystal panel of the present invention. In FIG. 13, reference numeral 1301 designates a TFT substrate. A driving circuit including a source signal line driving circuit 1303 and a gate signal line driving circuit 1304 includes circuit TFTs (not shown), and a pixel portion 1302 includes pixel TFTs (not shown) arranged in matrix form. As the TFT substrate 1301, a glass substrate or the like is used.

In the pixel portion 1302, source signal lines (not shown) connected to the source signal line driving circuit 1303 intersect with gate signal lines (not shown) connected to the gate signal line driving circuit 1304. Regions surround by the source signal lines and the gate signal lines are pixels (not shown).

An image signal sampled by a timing signal in the source signal line driving circuit 1303 is supplied to the source signal line. The image signal inputted to the source signal line is selected by the pixel TFT, and is written in a predetermined pixel electrode. The pixel TFT is operated by a selection signal inputted through the gate signal line from the gate signal line driving circuit 1304.

Embodiment 5

Here, a method of fabricating a pixel TFT of a pixel portion and a circuit TFT of a driving circuit (source signal line driving circuit, gate signal line driving circuit, etc.) provided in the periphery of the pixel portion on the same substrate will be described in detail in accordance with steps. However, for simplification of explanation, a CMOS circuit and an n-channel TFT are shown in the figure.

Figure 19A:
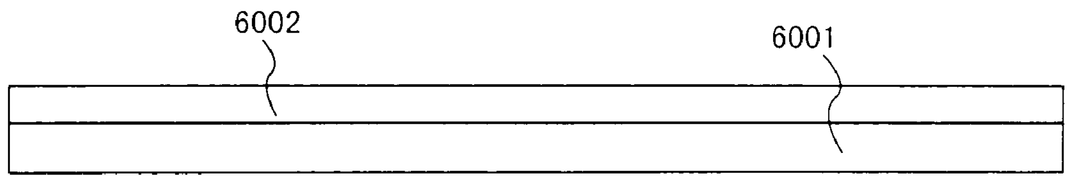
FIGS. 19A to 19D are views of a fabricating process of a TFT.

In FIG. 19A, reference numeral 6001 designates a substrate having heat resistance, and a quartz substrate, a silicon substrate, a ceramic substrate, or a metal substrate (typically, a stainless substrate) may be used. In the case of using any substrate, an under film (preferably, an insulating film containing silicon as its main constituent) may be provided if necessary.

Next, a semiconductor film having a thickness of 20 to 150 nm (preferably 30 to 80 nm) and having an amorphous structure is formed by a well-known method such as a plasma CVD method or a sputtering method. In this embodiment, an amorphous silicon film was formed to a thickness of 53 nm by the plasma CVD method. The semiconductor film having the amorphous structure includes an amorphous semiconductor film and a microcrystalline semiconductor film, and a compound semiconductor film including an amorphous structure, such as an amorphous silicon germanium film, may be used. In the case where an under film is formed, since the under film and the amorphous silicon film can be formed by the same film formation method, both may be continuously formed. When the under film is not exposed to the atmospheric air after it is formed becomes possible to prevent pollution of its surface, and it is possible to reduce fluctuation in characteristics of TFTs to be fabricated and variation in threshold voltage.

Then, by using a well-known crystallization technique, a crystalline silicon film 6002 is formed from the amorphous silicon film. For example, a laser crystallizing method or a thermal crystallizing method (solid phase growth method) may be used. Here, in accordance with a technique disclosed in Japanese Patent Application Laid-open No. Hei 7-130652, the amorphous silicon film 6002 was formed by a crystallizing method using a catalytic element.

As the catalytic element for facilitating crystallization of the amorphous silicon film, a solution containing nickel (Ni) was applied by a spin coating method to form a Ni containing layer. As the catalytic element, cobalt (Co), iron (Fe), palladium (Pd), platinum (Pt), copper (Cu), gold (Au), or the like can be used in addition to nickel.

Besides, as a step of adding the catalytic element, an ion implantation method using a resist mask or a plasma doping method can also be used. In this case, since it becomes easy to reduce the occupied area of an added region and to control the growth distance of a lateral growth region, the method becomes an effective technique when a minute circuit is constructed.

Besides, prior to the step of crystallization, although depending on the hydrogen content in the amorphous silicon film, it is desirable that a heat treatment at 400 to 500° C. for about one hour is carried out to decrease the hydrogen content to 5 atom % or less, and then crystallization is made. When the step of adding the catalytic element is ended, after dehydrogenation at 450° C. for about one hour is carried out, the amorphous silicon film is crystallized by carrying out a heat treatment in an inert gas atmosphere, a hydrogen atmosphere or an oxygen atmosphere at a temperature of 500 to 700° C. (typically 550 to 650° C.) for 4 to 24 hours. In this embodiment, a heat treatment in a nitrogen atmosphere at 600° C. for 12 hours was carried out so that the amorphous silicon film was crystallized.

When the amorphous silicon film was crystallized, since rearrangement of atoms occurred and densification was made, the thickness of the fabricated crystalline silicon film was decreased by about 1 to 15% from the original thickness (in this embodiment, 53 nm) of the amorphous silicon film (FIG. 19A).

Figure 19B:
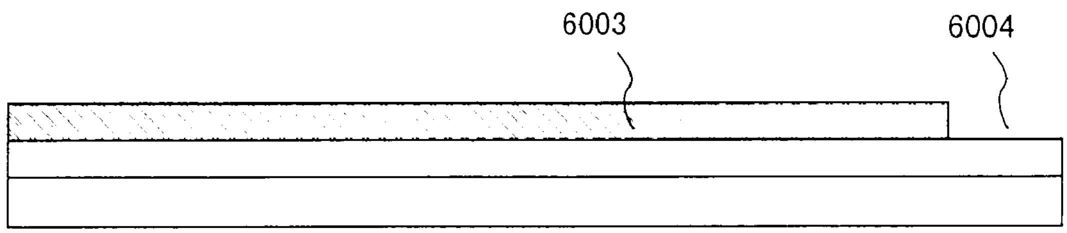

Then, a protective oxide film 6003 made of a silicon oxide film and having, a thickness of 130 nm was formed on the crystalline silicon film 6002. Then, for the purpose of forming a gettering region in the crystalline silicon film 6002, an opening portion 6004 is formed in the protective oxide film 6003 (FIG. 19B).

Figure 19C:
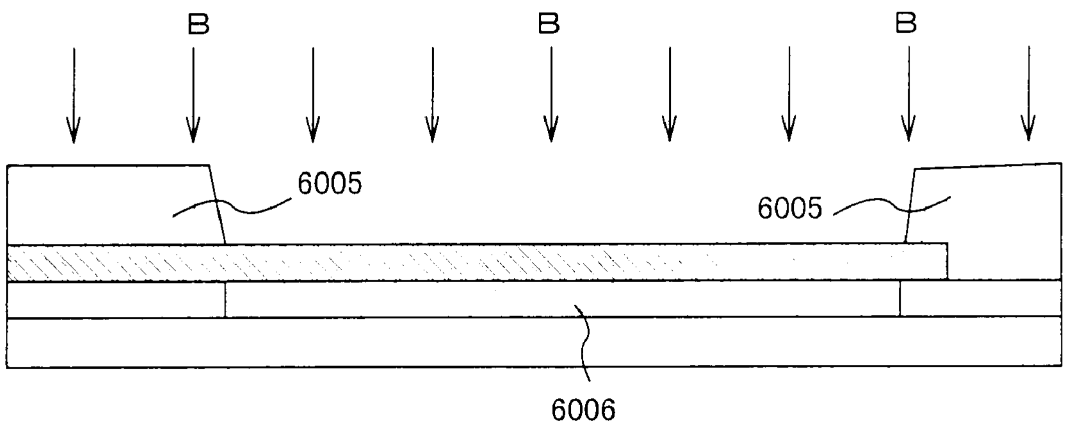

Then, a resist mask 6005 was formed to cover the opening portion 6004 and a portion of the crystalline silicon film 6002 where a p-channel TFT was to be formed. Then, for the purpose of controlling a threshold voltage, a portion of the crystalline silicon film 6002 where an n-channel TFT was to be formed, was doped with boron (B) as an impurity to give a p type. The doping was carried out at an acceleration voltage of about 30 keV, and adjustment was made so that the concentration of boron (B) became about $5\times10^{17}$ to $5\times10^{18}$ atoms/cm$^3$. In this embodiment, the concentration of boron (B) was made $1\times10^{18}$ atoms/cm$^3$. Addition of boron (B) may be carried out by an ion doping method, or boron can be added at the same time as the formation of the amorphous silicon film. According to the characteristics of the crystalline silicon film 6002, phosphorus (P) may be added instead of boron (B) in order to control the threshold voltage. Although the addition of boron (B) here is not always necessary, it is preferable to form a portion (channel doped portion) 6006 of the crystalline silicon film 6002 where boron (B) is added, in order to restrict the threshold voltage of the n-channel TFT in a predetermined range (FIG. 19C).

After the resist mask 6005 is removed, phosphorus is doped in order to remove nickel in the crystalline silicon film 6002. Then, phosphorus is doped in the crystalline silicon film 6002 from the opening portion 6004, so that a gettering region 6007 is formed. At this time, the acceleration voltage of doping and the thickness of the protective oxide film 6003 are optimized, so that phosphorus does not substantially penetrate the protective oxide film 6003.

The doping was adjusted so that the concentration of phosphorus became about $1\times10^{20}$ to $1\times10^{21}$ atoms/cm$^3$. In this embodiment, the doping was carried out by using an ion doping apparatus so that the concentration of phosphorus (P) became $5\times10^{20}$ atoms, cm$^3$.

Incidentally, the acceleration voltage at the ion doping was made 10 kev. When the acceleration voltage is 10 kev, if the thickness of the protective oxide film 6003 is made 100 nm or more, phosphorus can hardly penetrate the film.

Figure 19D:
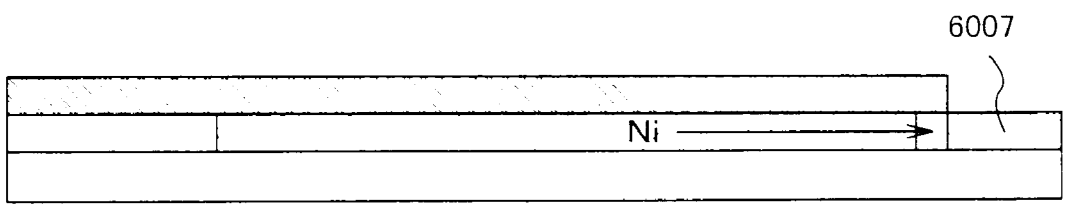

Thereafter, a heat annealing in a nitrogen atmosphere at 600° C. for 1 to 12 hours (in this embodiment, 12 hours) was carried out to make gettering of the nickel element. Nickel is attracted by phosphorus through heating. Although phosphorus atoms hardly move in the film at a temperature of 600° C., nickel atoms can move over a distance of about several hundred $\mu$m or more. From this, it is understood that phosphorus is one of most suitable elements for gettering of nickel (FIG. 19D).

Figure 20A:
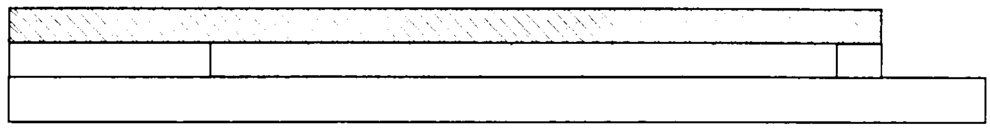
FIGS. 20A to 20D are views of the fabricating process of the TFT.
Figure 20B:
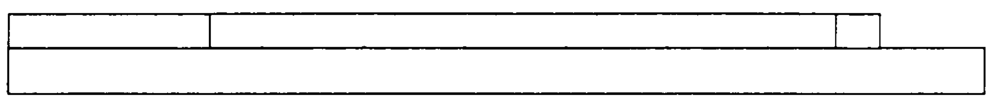

Next, etching is carried out using the protective oxide film 6003 as a mask, so that the gettering region 6007 is removed (FIG. 20A).

Figure 20C:
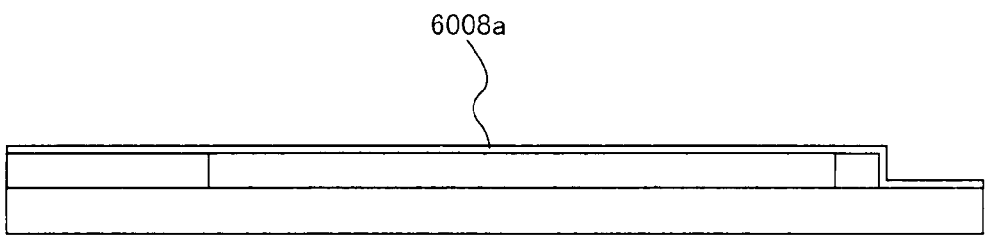

After the protective oxide film 6003 was removed (FIG. 20B), an oxide film 6008*a* made of a silicon oxide film was formed over the substrate 6001 so as to cover the amorphous silicon film 6002. In this embodiment, the oxide film was formed to a thickness of 20 nm (FIG. 20C).

Figure 20D:
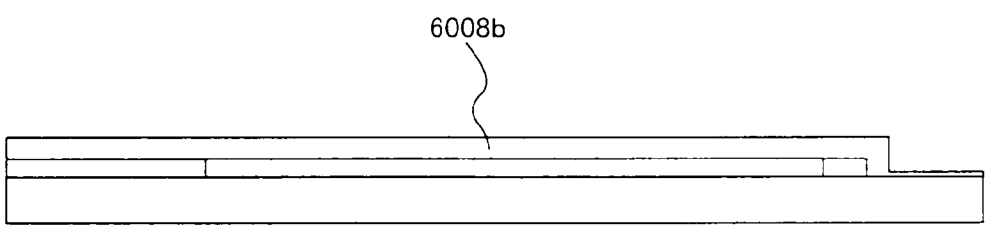

Next, the crystalline silicon film 6003 was subjected to ashing in an atmosphere of an oxidizing gas, so that the density of silicon in the crystalline silicon film 6003 was raised and the film was made dense. In this embodiment, thermal oxidation was made at 950° C. in an oxygen atmosphere, so that the thickness of the crystalline silicon film 6003 was decreased by about 15 nm (FIG. 20D).

Figure 21A:
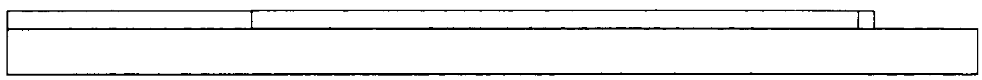
FIGS. 21A to 21D are views of the fabricating process of the TFT.
Figure 21B:
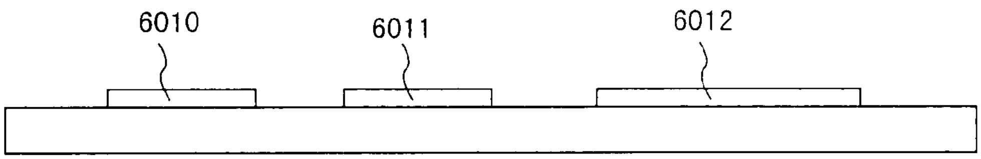

Then a post-heat treatment oxide film 6008*b* in which its thickness was increased by the thermal oxidation was removed (FIG. 21A), and patterning was made, so that semiconductor films 6010, 6011 and 6012 were formed (FIG. 21B).

Figure 21C:
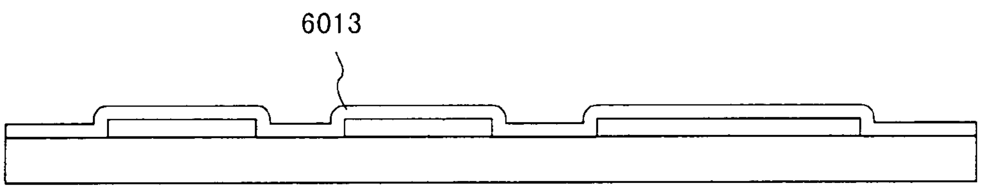

Then a first gate insulating film 6013 was formed to cover the semiconductor films 6010. 6011 and 6012. Typically, it is appropriate that the first gate insulating film 6013 made of a silicon oxide film or a silicon nitride film is formed to a thickness of 5 to 200 nm (preferably 100 to 150 nm). In this embodiment, the thickness of the first gate insulating film 6013 made of a silicon oxide film or a film containing silicon oxide as its main ingredient was made 40 nm (FIG. 21C).

Figure 21D:
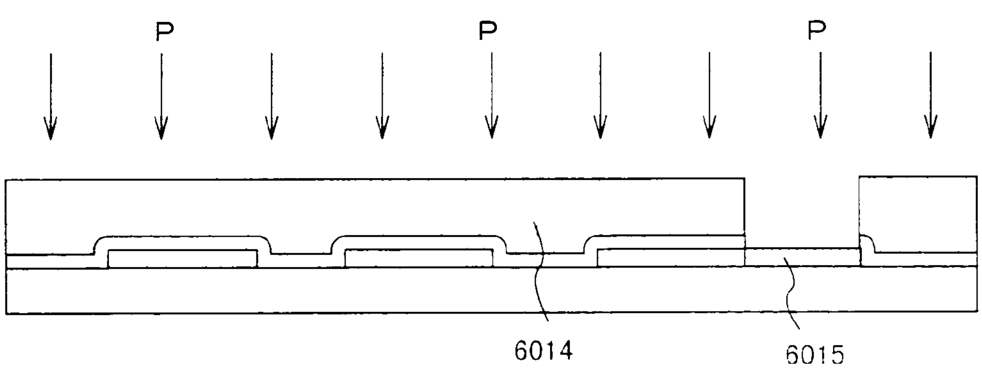

Next, a part of the first gate insulating film 6013 was etched by using, a resist mask 6014, so that a part of the semiconductor film 6012 was exposed. Then phosphorus was doped so that an impurity region (Cs region) 6015 which became a part of Cs was formed. Doping was carried out at an acceleration voltage of about 10 kev, and adjustment was made so that the concentration of phosphorus (P) became about $1\times10^{19}$ to $1\times10^{20}$ atoms/cm$^3$. In this embodiment, the doping was carried out by using an ion doping apparatus so that the concentration of phosphorus (P) became $5\times10^{19}$ atoms/cm$^3$ (FIG. 21D).

Figure 22A:
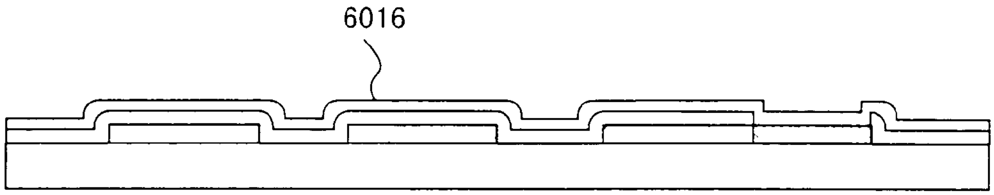
FIGS. 22A to 22D are views of the fabricating process of the TFT.

After the resist mask 6014 was removed, a second gate insulating film 6016 was formed. Typically, it is appropriate that the thickness of the second gate insulating film 6016 is made 5 to 200 nm (preferably 100 to 150 nm). In this embodiment, the second gate insulating film 6016 made of a silicon nitride film was formed to a thickness of 20 nm (FIG. 22A).

Then a first conductive film 6017 and a second conductive film 6018 were sequentially formed. In this embodiment, although a gate electrode is made to have a multi-layer structure, the gate electrode may be formed of a single layer.

Figure 22B:
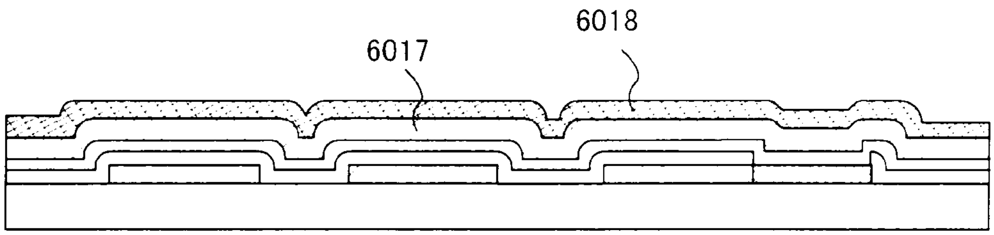

The first conductive film 6017 is a crystalline silicon film containing an n-type impurity and is formed to a thickness of 150 nm by using a CVD method. The second conductive film 6018 is made of tungsten suicide and is formed to a thickness of 150 nm by sputtering (FIG. 22B). In this case, resistance becomes slightly higher than a case where a metal film is used. However, since the laminate structure of the metal silicide film and the silicon film has high heat resistance and also has a high resistance to oxidation, it is an effective structure. Incidentally, the first conductive film 6017 may be formed of tantalum nitride (TaN), tungsten nitride (WN), titanium nitride (TiN), molybdenum nitride (MoN), tungsten silicide, titanium silicide, or molybdenum silicide, and the second conductive film 6022 may be formed of an element selected from tantalum (Ta), titanium (Ti), molybdenum (Mo), and tungsten (W), an alloy containing the foregoing element as its main ingredient, or an alloy film (typically Mo—W alloy film. Mo—Ta alloy film) of a combination of the foregoing elements.

Figure 22C:
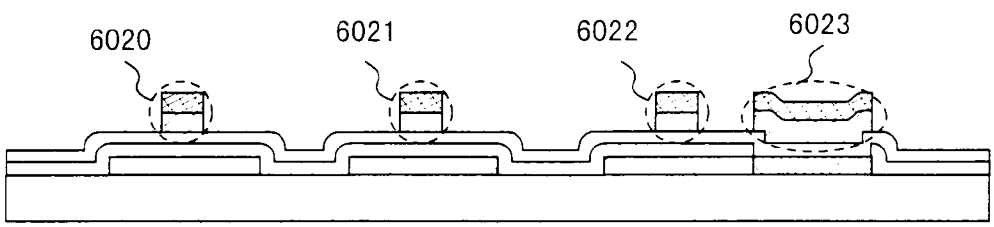

Next, the first conductive film 6017 and the second conductive film 6018 are patterned, so that a gate electrode 6020 of a p-channel TFT, gate electrodes 6021 and 6022 of n-channel TFTS, and a Cs electrode 6023 were formed (FIG. 22C).

Figure 22D:
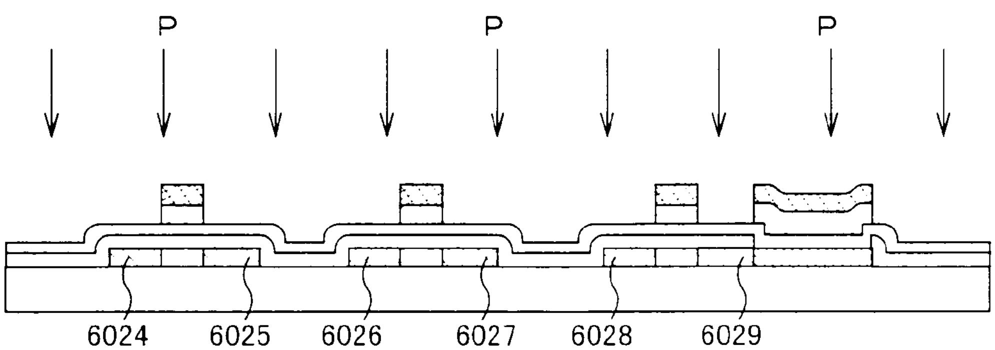

Then the semiconductor films 6010, 6011 and 6012 were partially doped with an impurity to give an n-type using the gate electrodes 6020, 6021 and 6022, and the Cs electrode 6023 as masks, so that impurity regions 6024 to 6029 were formed. As the impurity to give the n type, phosphorus (P) or arsenic (As) may be used, and here, an ion doping method using phosphine ($PH_3$) was applied to add phosphorus (P). The doping was carried out at an acceleration voltage of about 40 keV, and adjustment was made so that the concentration of phosphorus (P) became about $5\times10^{17}$ to $5\times10^{18}$ atoms/cm$^3$. In this embodiment, the doping was carried out by using an ion doping apparatus so that the concentration of phosphorus (P) in the impurity regions 6024 to 6029 became $1\times10^{18}$ atoms cm$^3$. In the present specification, the concentration of the impurity to give the n-type contained in the impurity regions 6024 to 6029 formed here is indicated by ($n^-$) (FIG. 22D).

Next, resist masks 6030, 6031 and 6032 were formed so as to cover the semiconductor film 6010 which became the p-channel TFT and part of the semiconductor films 6011 and 6012 which became the n-channel TFTs. Then, by using the resist masks 6030, 6031 and 6032, an impurity to give an n type is doped in parts of the semiconductor films 6011 and 6012, so that impurity regions 6033 to 6036 were formed.

Figure 23A:
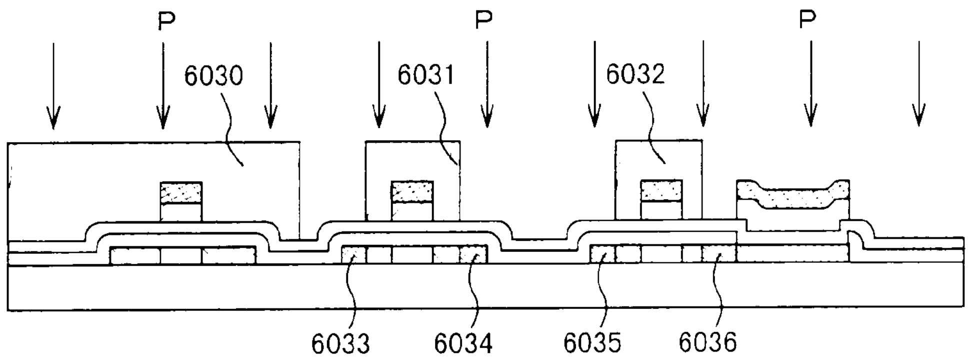
FIGS. 23A to 23C are views of the fabricating process of the TFT.

The impurity regions 6033 to 6036 were formed by an ion doping method using phosphine ($PH_3$), the doping was carried out at an acceleration voltage of about 40 keV, and adjustment was made so that the concentration of phosphorus (P) became $5\times10^{19}$ to $5\times10^{20}$ atoms/cm$^3$. In this embodiment, adjustment was made so that the concentration of phosphorus (P) of the impurity regions 6033 to 6036 became $1\times10^{20}$ atoms cm$^3$. In the present specification, the concentration of the impurity to give the n-type contained in the impurity regions 6033 to 6036 formed here is indicated by ($n^+$) (FIG. 23A).

Figure 23B:
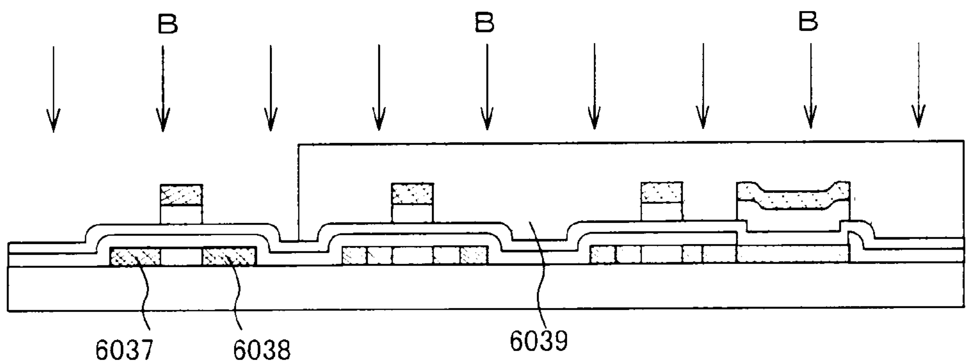

The resist masks 6030 to 6032 were removed, and a portion which became the n-channel TFTs and a portion which became Cs were covered with a resist mask 6039. Then an impurity to give a p-type was doped in the semiconductor film 6010. In this embodiment, impurity regions 6037 and 6038 were formed by an ion doping method using diborane ($B_2H_6$). The doping was carried out at an acceleration voltage of about 40 keV, and adjustment was made so that the concentration of boron (B) became about $5\times10^{19}$ to $5\times10^{20}$ atoms/cm$^3$. In this embodiment, adjustment was made so that the concentration of boron (B) in the impurity regions 6037 and 6038 became $1\times10^{20}$ atoms cm$^3$. In the present specification, the concentration of the impurity element to give the p-type contained in the impurity regions 6037 and 6038 formed here is indicated by ($p^+$). Although phosphorus (P) or boron (B) added in the previous steps is contained in the impurity regions 6037 and 6038, since boron (B) is added at a concentration sufficiently high as compared with that, the conductivity of the p-type is secured, and any influence is not exerted on the characteristics of the TFT (FIG. 23B).

Figure 23C:
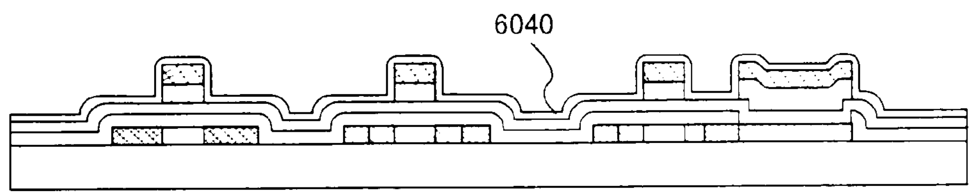

After the resist mask 6039 was removed, an insulating film 6040 was formed. The insulating film 6040 was made of a silicon nitride film and was formed to a thickness of 70 nm by a CVD method (FIG. 23C).

Figure 24A:
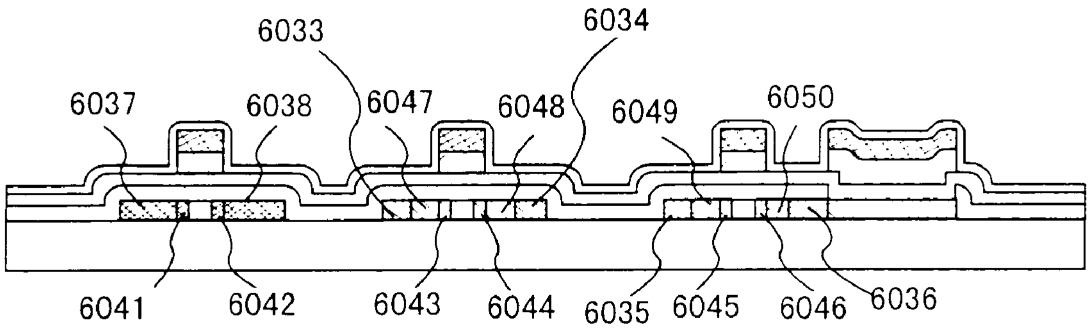
FIGS. 24A to 24C are views of the fabricating process of the TFT.

Next, heating is made in a nitrogen atmosphere at 850° C. for 30 minutes, so that the impurities contained in the impurity regions are diffused in the semiconductor films 6010 to 6012 and extend to the lower portions of the gate electrodes 6020 to 6022. Impurity regions 6041 to 6046 positioned under the gate electrodes 6020 to 6022 are called Lov regions. Impurity regions 6047 to 6050 which are not positioned under the gate electrodes 6020 to 6022 and are in contact with impurity regions (source regions or drain regions) 6033 to 6036 are called Lof regions. The impurity regions 6033 to 6038, and 6041 to 6050 are activated by the heat treatment (FIG. 24A).

Figure 24B:
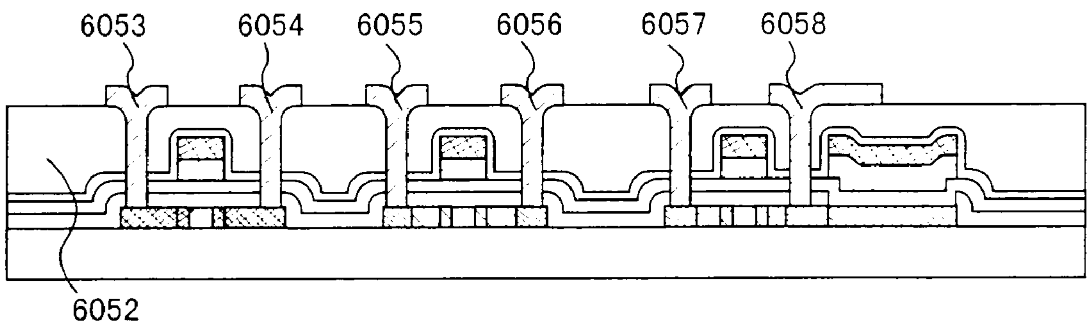

Next, a first interlayer insulating film 6052 made of silicon oxide or silicon nitride oxide is formed to a thickness of 500 to 1500 nm. In this embodiment, silicon nitride oxide was used and the thickness was made 1000 nm. Thereafter, contact holes reaching the source regions or drain regions 6033 to 6038 are formed, and source wirings 6053, 6055 and 6057 and drain wirings 6054, 6056 and 6058 are formed. Incidentally, although not shown, in this embodiment, each of the source wirings and the drain wirings was made a laminate film of a four-layer structure in which a Ti film of 60 nm, a Ti film containing nitrogen and having a thickness of 40 nm, an aluminum film containing Si and having a thickness of 300 nm, and a Ti film of 100 nm were continuously formed by a sputtering method (FIG. 24B).

Figure 24C:
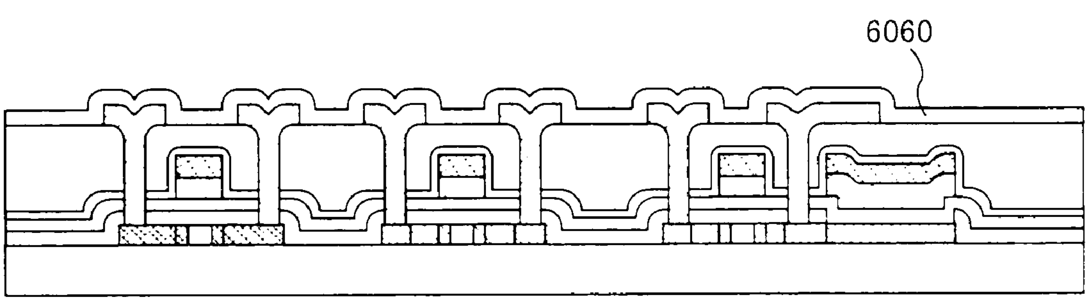

Next, a passivation film 6060 made of a silicon nitride film and having a thickness of 220 nm is formed on the first interlayer insulating film 6052 so as to cover the source wirings 6053, 6055 and 6057 and the drain wirings 6054, 6056 and 6058 (FIG. 24C). Then a second interlayer insulating film 6061 is formed so as to cover the passivation film 6060. This second interlayer insulating film 6061 is made of an acrylic film and has a thickness of 800 nm.

Figure 25A:
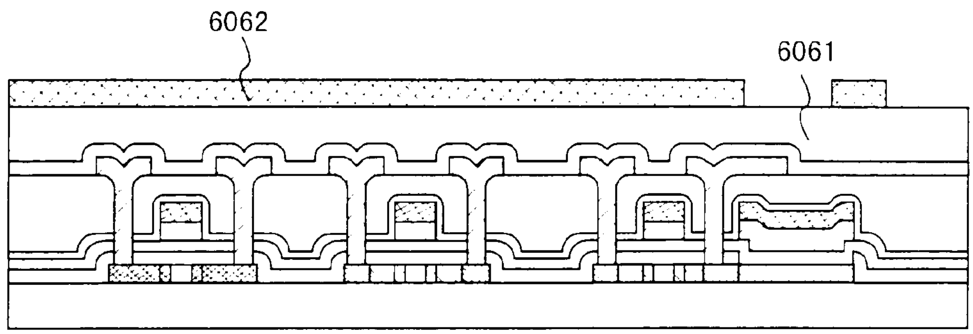
FIGS. 25A to 25C are views of the fabricating process of the TFT.

After the second interlayer insulating film 6061 made of the acrylic film is heated under the condition of 150° C. for 0.3 hr, a light shielding film 6062 made of a Ti film or a film containing Ti as its main constituent and having a thickness of 100 nm is formed on the second interlayer insulating film 6061 (FIG. 25A).

Figure 25B:
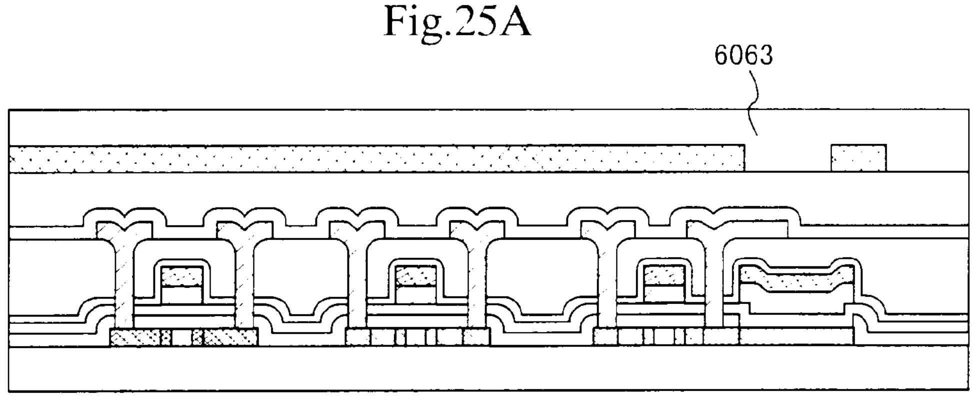

Then a third interlayer insulating film 6063 is formed on the second interlayer insulating film 6061 so as to cover the light shielding film 6062. The third interlayer insulating film 6063 is made of an acrylic film, and the thickness is made 500 to 1000 nm. In this embodiment, the thickness of the third interlayer insulating film 6063 was made 800 nm (FIG. 25B).

Figure 25C:
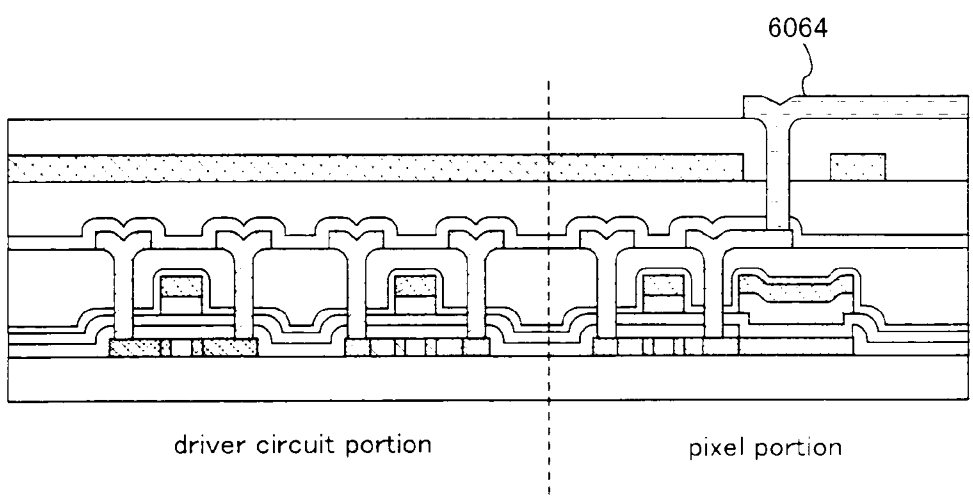

A contact hole is formed in the third interlayer insulating film 6063, and thereafter, a pixel electrode 6064 is formed. In this embodiment, the thickness of the pixel electrode 6064 was made 2.8 μm. The pixel electrode 6064 is electrically connected to the drain wiring 6058 through the contact hole. As the pixel electrode 6064, a transparent conductive film may be used (FIG. 25C).

As described above, the semiconductor device of the present invention has various features in the driver circuit and the pixel matrix circuit, and by the synergistic effect of these, a bright and high fineness image can be obtained, and an electro-optical device having high operation performance and reliability can be obtained. Besides, a high performance electronic equipment incorporating such an electro-optical device as a part is obtained.

Embodiment 6

In this embodiment, cell gap accuracy of a liquid crystal panel will be described.

Four kinds of liquid crystal panels were formed as follow:

1) A liquid crystal panel in which gap holding members are formed on a TFT substrate by the method described in the embodiment 1 and a microlens array is provided at a counter substrate.

2) A liquid crystal panel in which gap holding members are formed on a TFT substrate by the method described in the embodiment 1 and a microlens array is not provided.

3) A liquid crystal panel in which spherical spacers are scattered on a TFT substrate instead of formation of gap holding members and a microlens array is provided at a counter substrate.

4) A liquid crystal panel in which spherical spacers are scattered on a TFT substrate instead of formation of gap holding members and a microlens array is not provided at a counter substrate.

Incidentally, in this embodiment, the height of the gap holding member was made 3.2 μm. the arrangement density was made 50 pieces/mm$^2$, the height of the spherical spacer was made 3.2 μm, and the arrangement density was made 50 pieces/mm$^2$.

On these four kinds of liquid crystal panels, cell gap accuracy, cell gap control methods against uneven color, and influence of presence of a microlens array are summarized in Table 1.

TABLE 1

| | microlens array substrate | |
|---|---|---|
| cell gap control method | presence | absence |
| gap holding member | 3.2 μm ± 0.15 μm, no uneven color | 3.2 μm ± 0.1 μm, no uneven color |
| spherical spacer | 3.2 μm ± 0.35 μm, uneven color exists | 3.2 μm ± 0.2 μm, no uneven color |

It is understood that in the case where the cell gap control method is the same, if the microlens array is included, the cell gap accuracy becomes low. This is because a warp is produced in a counter substrate by provision of a microlens array substrate, and this warp influences the cell gap. In the conventional method, in the case where there is no microlens array substrate, the uneven cell gap is ±0.2 μm, and uneven color is not produced. On the other hand, in the case where the microlens array substrate is provided, the uneven cell gap becomes ±0.35 μm, and uneven color is produced. Thus, in the case where the microlens array is provided, a cell gap control technique with higher accuracy becomes necessary.

It is understood that according to the present invention, even if the microlens array is provided, the cell gap accuracy is high, the influence of the warp of the substrate can be more effectively suppressed, and excellent display quality can be obtained.

Embodiment 7

In this embodiment, another example of the arrangement of gap holding members, different from that shown in FIG. 2, will be described.

Figure 26:
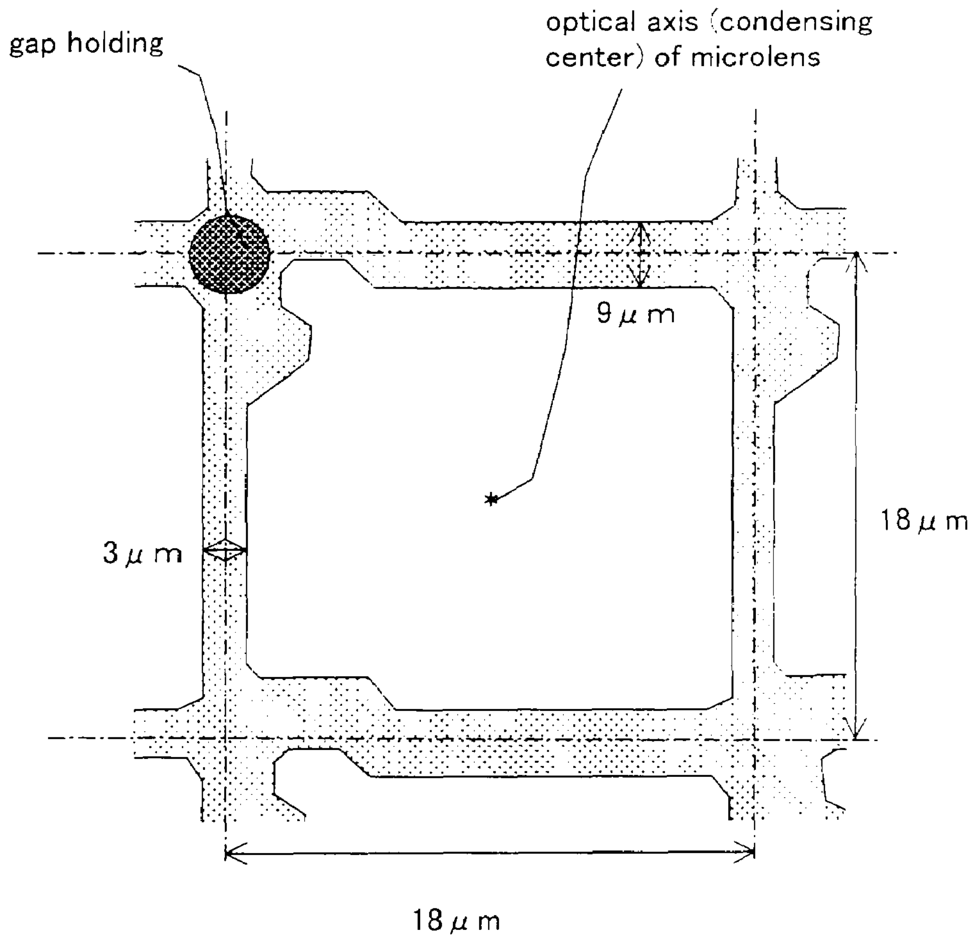
FIG. 26 is an enlarged view of a pixel portion.

In this embodiment, the gap holding member is provided at a position most distant from an optical axis (condensing center) of a microlens in the vicinity of the center of a pixel opening portion. FIG. 26 is an enlarged view of a pixel portion. In this embodiment, the size of a pixel is 18 μm×18 μm, the thinnest width of a light shielding portion in an X direction is about 3 μm, and the thinnest width of a light shielding portion in a Y direction is about 9 *μm*.

Figure 27:
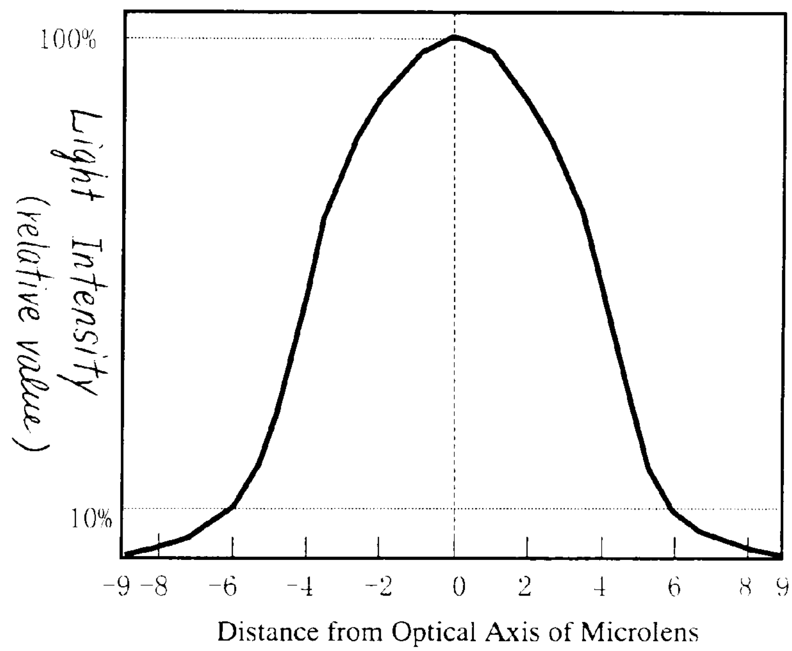
FIG. 27 is a view showing condensing characteristics of a microlens.

FIG. 27 is a view showing light condensing characteristics of a microlens. The horizontal axis indicates a distance (μm) from the optical axis of the microlens, and the vertical axis indicates light intensity (relative value) when light intensity at the condensing center is 100%.

In FIG. 27, a region where light intensity exceeds 10%, is called an effective light axis condensing region. In FIG. 27, it is understood that in a region where light intensity becomes 10% or less, that is, in the outside of the effective light flux condensing region, as compared with the effective light flux condensing region closer to the condensing center, the light intensity is varied at a gentle gradient. That is, as the disposed portion of the gap holding member passes through the region where the light intensity becomes 10% and approaches the condensing center, the use efficiency of light is abruptly lowered.

For example, when a case of disposing a spacer having a diameter of 3 μm in a region where the light intensity is 10% or less (for example, in FIG. 27, between 6 μm and 9 μm, and between −9 μm and −6 μm) is compared with a case of disposing the spacer in a region where the light intensity becomes larger than 10% (in FIG. 27, between 3 μm and 6 μm, and between −6 μm and −3 μm), the use efficiency of the latter is as low as a factor of not less than 6 times the former.

Thus, in the case where the gap holding member is disposed in the light condensing region of the microlens, it is preferable that the member is disposed within the region where the light intensity is 10% or less. However, in the case where a light shielding region is narrow and the gap holding member projects from the light shielding region, or in the case where the gap holding member can not be disposed on the light shielding region because of design and manufacture, there is no problem if the portion projecting from the light shielding region is within the region where the light intensity is 10% or less.

Besides, when the disturbance of orientation of liquid crystal by the gap holding member, bonding accuracy, and spacer formation accuracy are taken into consideration, it is further desirable to dispose the gap holding member in the region where the light intensity is 5%, or less.

As described above, when the gap holding member is disposed preferably in the region where the light intensity is 10% or less, more preferably in the region where the light intensity is 5%, or less, it is possible to almost eliminate such disadvantages that contrast is lowered or a display image is disturbed by the disturbance of the orientation of the liquid crystal at the periphery of the gap holding member, and in the liquid crystal panel of the size of 18 μm×18 μm as the pixel size of this embodiment, a difference in the contrast due to the presence of the gap holding member can not be substantially recognized.

In the case of this embodiment, as compared with the case shown in FIG. 2, a further improvement in the contrast was recognized. Thus, from the viewpoint of the improvement of the contrast, in the case where a region through which light is not transmitted is narrow, it is more desirable that the gap holding member is provided in a region where the light intensity becomes 1/10 or less or 1/20 or less relative to the condensing peak of the microlens.

Incidentally, the structure of this embodiment can be used together with the structure shown in FIG. 2. Besides, even in a structure where the microlens array is provided on the TFT substrate, it is desirable to dispose the gap holding member in accordance with the same rule.

Embodiment 8

In the present invention, a substrate or an insulating film directly formed on the substrate may be flattened by using CMP (Chemical Mechanical Polishing) polishing. The CMP polishing can be performed using a well-known method.

In this embodiment, polishing is performed using a mixture of a silica sol and an electrolyte solution. In the electrolyte solution, a pressure of 100 kg/cm$^2$ is applied from a polishing pad to perform the polishing. The pressure at the polishing can be selected from the range of about 50 kg/cm$^2$ to 150 kg/cm$^2$. Besides, the polishing is performed while a gap between the surface to be polished and the polishing pad is made 0.1 μm.

In this embodiment, since the substrate or the insulating film directly formed on the substrate is flattened by the above structure, two substrates of a liquid crystal panel can be controlled more uniformly at a cell gap of a desired value. Thus, even if the focal depth becomes shallow by making the microlens array minute, it becomes possible to suppress deterioration of display quality of a liquid crystal projector due to defects such as uneven display or uneven brightness.

As described above, according to the present invention, it becomes possible to dispose the gap holding members at desired positions through the foregoing structures. Besides, it becomes possible to control the cell gap more uniformly than the case where spherical spacers are used.

The gap holding member is formed over a contact portion between a pixel electrode of a pixel and a wiring (drain wiring) connected to a drain region of a pixel TFT. The contact portion between the pixel electrode and the drain wiring is not positioned at an opening portion of a pixel (region which is used for an actual display and through which visible light is transmitted). Besides, since the contact portion is distant from the region through which the visible light is transmitted to such a degree that the orientation of a liquid crystal material is not disturbed, the disturbance (disclination) of an image display is not easily produced.

Since it becomes possible to uniformly control the two substrates of a liquid crystal panel at a cell gap of a desired value by the gap holding member, even if the focal depth becomes shallow by making the microlens array minute, it becomes possible to suppress the deterioration of display quality of a liquid crystal projector due to defects such as uneven display or uneven brightness.

Further, according to the present invention, by the foregoing structures, the brightness of an image can be raised without raising the brightness of a light source, and the liquid crystal projector can be made thin and lightweight, and at the same time, high fineness, high quality and high brightness can be achieved.

What is claimed is:

1. A liquid crystal panel comprising:

a first substrate including a plurality of pixel electrodes;

a second substrate including a counter electrode;

a liquid crystal;

a plurality of gap holding members formed by etching an insulating film; and a microlens array including a plurality of microlenses, wherein:

the first substrate faces the second substrate through the plurality of pixel electrodes, the counter electrode, the liquid crystal, and the plurality of gap holding members;

the microlens array is provided in the second substrate at a side opposite to the first substrate; and the gap holding members are selectively formed over contact holes in which each of the plurality of pixel electrodes is connected with a wiring connected with a thin film transistor.

2. A liquid crystal panel according to claim 1, wherein each of the plurality of gap holding members has a shape selected from the group consisting of a circular column shape, an elliptical column shape, and a polygonal column shape.

3. A liquid crystal panel according to claim 1, wherein a side of each of the plurality of gap holding members is taper-shaped.

4. A liquid crystal panel according to claim 1, wherein each of the plurality of gap holding members contains a material selected from the group consisting of polyimide, acryl, polyamide, polyimidoamide, and epoxy resin.

5. A liquid crystal panel according to claim 1, wherein each of the plurality of gap holding members contains one of an ultraviolet ray curing resin and a thermosetting resin.

6. A liquid crystal panel according to claim 1, wherein the liquid crystal panel sizes diagonally 1 inch or less.

7. A liquid crystal panel according to claim 1, wherein the plurality of gap holding members are provided in a region where light intensity becomes 1/10 or less of a condensing peak of the microlens.

8. A liquid crystal panel according to claim 1, wherein the plurality of gap holding members are provided in a region where light intensity becomes 1/20 or less of a condensing peak of the microlens.

9. The liquid crystal panel according to claim 1 wherein said plurality of gap holding members are arranged with a constant interval.

10. A liquid crystal panel comprising:

a first substrate including a plurality of pixel electrodes;

a second substrate including a counter electrode;

a liquid crystal;

a plurality of gap holding members formed by etching an insulating film; and a microlens array including a plurality of microlenses, wherein:

the first substrate faces the second substrate through the plurality of pixel electrodes, the counter electrode, the liquid crystal, and the plurality of gap holding members;

the microlens array is provided on a surface of the second substrate, the surface being opposite to a surface that faces the first substrate; and the gap holding members are selectively formed over contact holes in which each of the plurality of pixel electrodes is connected with a wiring connected with a thin film transistor.

11. A liquid crystal panel according to claim 10, wherein each of the plurality of gap holding members has a shape selected from the group consisting of a circular column shape, an elliptical column shape, and a polygonal column shape.

12. A liquid crystal panel according to claim 10, wherein a side of each of the plurality of gap holding members is taper-shaped.

13. A liquid crystal panel according to claim 10, wherein each of the plurality of gap holding members contains a material selected from the group consisting of polyimide, acryl, polyamide, polyimidoamide, and epoxy resin.

14. A liquid crystal panel according to claim 10, wherein each of the plurality of gap holding members contains one of an ultraviolet ray curing resin and a thermosetting resin.

15. A liquid crystal panel according to claim 10, wherein the liquid crystal panel sizes diagonally 1 inch or less.

16. A liquid crystal panel according to claim 10, wherein the plurality of gap holding members are provided in a region where light intensity becomes 1/10 or less of a condensing peak of the microlens.

17. A liquid crystal panel according to claim 10, wherein the plurality of gap holding members are provided in a region where light intensity becomes 1/20 or less of a condensing peak of the microlens.

18. The liquid crystal panel according to claim 10 wherein said plurality of gap holding members are arranged with a constant interval.

19. A liquid crystal panel comprising:

a first substrate including a thin film transistor and a pixel electrode;

a second substrate including a counter electrode;

a liquid crystal;

a plurality of gap holding members formed by etching an insulating; and a microlens array including a plurality of microlenses, wherein:

the first substrate faces the second substrate through the thin film transistor, the pixel electrode, the counter electrode, the liquid crystal, and the plurality of gap holding members;

the microlens array is provided in the second substrate at a side opposite to the first substrate; and one of the gap holding members is selectively formed over a contact hole in which the pixel electrode is connected with a wiring connected with the thin film transistor.

20. A liquid crystal panel according to claim 19, wherein:

each of the plurality of thin film transistors includes a semiconductor film including a source region, a drain region, and a channel formation region;

the source regions or the drain regions of the plurality of thin film transistors are respectively connected to the plurality of pixel electrodes at contact portions; and the plurality of gap holding members are provided over the contact portions.

21. A liquid crystal panel according to claim 19, wherein each of the plurality of gap holding members has a shape selected from the group consisting of a circular column shape, an elliptical column shape, and a polygonal column shape.

22. A liquid crystal panel according to claim 19, wherein a side of each of the plurality of gap holding members is taper-shaped.

23. A liquid crystal panel according to claim 19, wherein each of the plurality of gap holding members contains a material selected from the group consisting of polyimide, acryl, polyamide, polyimidoamide, and epoxy resin.

24. A liquid crystal panel according to claim 19, wherein each of the plurality of gap holding members contains one of an ultraviolet ray curing resin and a thermosetting resin.

25. A liquid crystal panel according to claim 19, wherein the liquid crystal panel sizes diagonally 1 inch or less.

26. A liquid crystal panel according to claim 19, wherein the plurality of gap holding members are provided in a region where light intensity becomes 1/10 or less of a condensing peak of the microlens.

27. A liquid crystal panel according to claim 19, wherein the plurality of gap holding members are provided in a region where light intensity becomes 1/20 or less of a condensing peak of the microlens.

28. The liquid crystal panel according to claim 19 wherein said plurality of gap holding members are arranged with a constant interval.

29. A liquid crystal panel comprising:

a first substrate including a plurality of thin film transistors and a plurality of pixel electrodes;

a second substrate including a counter electrode;

a liquid crystal;

a plurality of gap holding members formed by etching an insulating; and a microlens array including a plurality of microlenses, wherein:

the plurality of thin film transistors control potentials applied to the plurality of pixel electrodes;

the first substrate faces the second substrate through the plurality of thin film transistors, the plurality of pixel electrodes, the counter electrode, the liquid crystal, and the plurality of gap holding members;

the microlens array is provided on a surface of the second substrate, the surface being opposite to a surface that faces the first substrate; and the plurality of microlenses are provided on one-on-one basis with respect to the plurality of pixels, wherein the gap holding members are selectively formed over contact holes in which each of the plurality of pixel electrodes is connected with a wiring connected with one of the plurality of thin film transistors.

30. A liquid crystal panel according to according to claim 29, wherein:

each of the plurality of thin film transistors includes a semiconductor film including a source region, a drain region, and a channel formation region;

the source regions or the drain regions of the plurality of thin film transistors are respectively connected to the plurality of pixel electrodes at contact portions; and the plurality of gap holding members are provided over the contact portions.

31. A liquid crystal panel according to claim 29, wherein each of the plurality of gap holding members has a shape selected from the group consisting of a circular column shape, an elliptical column shape, and a polygonal column shape.

32. A liquid crystal panel according to claim 29, wherein a side of each of the plurality of gap holding members is taper-shaped.

33. A liquid crystal panel according to claim 29, wherein each of the plurality of gap holding members contains a material selected from the group consisting of polyimide, acryl, polyamide, polyimidoamide, and epoxy resin.

34. A liquid crystal panel according to claim 29, wherein each of the plurality of gap holding members contains one of an ultraviolet ray curing resin and a thermosetting resin.

35. A liquid crystal panel according to claim 29, wherein the liquid crystal panel sizes diagonally 1 inch or less.

36. A liquid crystal panel according to claim 29, wherein the plurality of gap holding members are provided in a region where light intensity becomes 1/10 or less of a condensing peak of the microlens.

37. A liquid crystal panel according to claim 29, wherein the plurality of gap holding members are provided in a region where light intensity becomes 1/20 or less of a condensing peak of the microlens.

38. The liquid crystal panel according to claim 29 wherein said plurality of gap holding members are arranged with a constant interval.

39. A liquid crystal projector comprising:

a white light source;

splitting means for splitting white light emitted from the white light source into a plurality of lights having different colors;

a plurality of liquid crystal panels respectively corresponding to the plurality of lights;

first optical means for irradiating the plurality of lights to the plurality of corresponding liquid crystal panels; and second optical means for condensing a plurality of transmitted lights transmitted through the plurality of liquid crystal panels, wherein:

at least one of the plurality of liquid crystal panels includes a first substrate and a second substrate;

the plurality of lights are irradiated from a side of the second substrate to the liquid crystal panel;

a plurality of gap holding members are provided between the first substrate and the second substrate wherein said plurality of gap holding members are formed by etching an insulating film; and a microlens array is provided at a side of the second substrate where the plurality of lights are irradiated, wherein the gap holding members are selectively formed over contact holes in which each of a plurality of pixel electrodes is connected with a wiring connected with a thin film transistor.

40. A liquid crystal projector according to claim 39, wherein each of the plurality of gap holding members has a shape selected from the group consisting of a circular column shape, an elliptical column shape, and a polygonal column shape.

41. A liquid crystal projector according to claim 39, wherein a side of each of the plurality of gap holding members is taper-shaped.

42. A liquid crystal projector according to claim 39, wherein each of the plurality of gap holding members contains a material selected from the group consisting of polyimide, acryl, polyamide, polyimidoamide, and epoxy resin.

43. A liquid crystal projector according to claim 39, wherein each of the plurality of gap holding members contains one of an ultraviolet ray curing resin and a thermosetting resin.

44. A liquid crystal projector according to claim 39, wherein the liquid crystal panel sizes diagonally 1 inch or less.

45. The liquid crystal projector according to claim 39 wherein said plurality of gap holding members are arranged with a constant interval.

46. A liquid crystal projector comprising:

a white light source;

splitting means for splitting white light emitted from the white light source into a plurality of lights having different colors;

a plurality of liquid crystal panels respectively corresponding to the plurality of lights;

first optical means for irradiating the plurality of lights to the plurality of corresponding liquid crystal panels; and second optical means for condensing a plurality of transmitted lights transmitted through the plurality of liquid crystal panels, wherein:

at least one of the plurality of liquid crystal panels includes a first substrate and a second substrate;

the plurality of lights are irradiated from a side of the second substrate to the liquid crystal panel;

a plurality of pixels are provided on the first substrate;

each of the plurality of pixels includes a pixel electrode and a thin film transistor connected to the pixel electrode;

a plurality of gap holding members are provided between the first substrate and the second substrate wherein said plurality of gap holding members are formed by etching an insulating film;

a microlens array is provided at a side of the second substrate where the plurality of lights are irradiated; and a plurality of microlenses included in the microlens array are provided on one-on-one basis with respect to the plurality of pixels, wherein one of the gap holding members is selectively formed over a contact hole in which the pixel electrode is connected with a wiring connected with the thin film transistor.

47. A liquid crystal projector according to claim 46, wherein:

the thin film transistor included in each of the plurality of pixels includes a semiconductor film including a source region, a drain region, and a channel formation region; and the source regions or the drain regions are respectively connected to the plurality of pixel electrodes at contact portions.

48. A liquid crystal projector according to claim 46, wherein each of the plurality of gap holding members has a shape selected from the group consisting of a circular column shape, an elliptical column shape, and a polygonal column shape.

49. A liquid crystal projector according to claim 46, wherein a side of each of the plurality of gap holding members is taper-shaped.

50. A liquid crystal projector according to claim 46, wherein each of the plurality of gap holding members contains a material selected from the group consisting of polyimide, acryl, polyamide, polyimidoamide, and epoxy resin.

51. A liquid crystal projector according to claim 46, wherein each of the plurality of gap holding members contains one of an ultraviolet ray curing resin and a thermosetting resin.

52. A liquid crystal projector according to claim 46, wherein the liquid crystal panel sizes diagonally 1 inch or less.

53. The liquid crystal projector according to claim 46 wherein said plurality of gap holding members are arranged with a constant interval.

54. A liquid crystal projector comprising:

a white light source;

splitting means for splitting white light emitted from the white light source into a plurality of lights having different colors;

a plurality of liquid crystal panels respectively corresponding to the plurality of lights;

first optical means for irradiating the plurality of lights to the plurality of corresponding liquid crystal panels; and second optical means for condensing a plurality of transmitted lights transmitted through the plurality of liquid crystal panels, wherein:

at least one of the plurality of liquid crystal panels includes a first substrate and a second substrate;

the plurality of lights are irradiated from a side of the second substrate to the liquid crystal panel;

a pixel portion including a plurality of pixels is provided on the first substrate;

each of the plurality of pixels includes a pixel electrode and a thin film transistor connected to the pixel electrode, said thin film transistor comprising a crystalline semiconductor film including a channel region therein;

a plurality of gap holding members are provided between the pixel portion and the second substrate wherein said plurality of gap holding members are formed by etching an insulating film;

a microlens array is provided at a side of the second substrate where the plurality of lights are irradiated; and a plurality of microlenses included in the microlens array are provided on one-on-one basis with respect to the plurality of pixels, wherein one of the gap holding members is selectively formed over a contact hole in which the pixel electrode is connected with a wiring connected with the thin film transistor.

55. A liquid crystal projector according to claim 54, wherein:

the thin film transistor included in each of the plurality of pixels includes a semiconductor film including a source region, a drain region, and a channel formation region; and the source regions or the drain regions are respectively connected to the plurality of pixel electrodes at contact portions.

56. A liquid crystal projector according to claim 54, wherein each of the plurality of gap holding members has a shape selected from the group consisting of a circular column shape, an elliptical column shape, and a polygonal column shape.

57. A liquid crystal projector according to claim 54, wherein a side of each of the plurality of gap holding members is taper-shaped.

58. A liquid crystal projector according to claim 54, wherein each of the plurality of gap holding members contains a material selected from the group consisting of polyimide, acryl, polyamide, polyimidoamide, and epoxy resin.

59. A liquid crystal projector according to claim 54, wherein each of the plurality of gap holding members contains one of an ultraviolet ray curing resin and a thermosetting resin.

60. A liquid crystal projector according to claim 54, wherein the liquid crystal panel sizes diagonally 1 inch or less.

61. The liquid crystal projector according to claim 54 wherein said plurality of gap holding members are arranged with a constant interval.

62. A projector having at least one liquid crystal panel, said liquid crystal panel comprising:

a first substrate including a plurality of pixel electrodes, a second substrate including a counter electrode;

a liquid crystal;

a plurality of gap holding members formed by etching an insulating film; and a microlens array including a plurality of microlenses wherein:

the first substrate faces the second substrate through the plurality of pixel electrodes, the counter electrode, the liquid crystal, and the plurality of gap holding members;

the microlens array is provided in the second substrate at a side opposite to the first substrate, and the gap holding members are selectively formed over contact holes in which each of the plurality of pixel electrodes is connected with a wiring connected with a thin film transistor.

63. The projector according to claim 62 wherein said plurality of gap holding members are arranged with a constant interval.

64. A projector having at least one liquid crystal panel, said liquid crystal panel comprising:

a first substrate including a plurality of pixel electrodes;

a second substrate including a counter electrode;

a liquid crystal;

a plurality of gap holding members formed by etching an insulating film; and a microlens array including a plurality of microlenses, wherein:

the first substrate faces the second substrate through the plurality of pixel electrodes, the counter electrode, the liquid crystal, and the plurality of gap holding members;

the microlens array is provided on a surface of the second substrate, the surface being opposite to a surface that faces the first substrate, and the gap holding members are selectively formed over contact holes in which each of the plurality of pixel electrodes is connected with a wiring connected with a thin film transistor.

65. The projector according to claim 64 wherein said plurality of gap holding members are arranged with a constant interval.

66. A projector having at least one liquid crystal panel, said liquid crystal panel comprising:

a first substrate including a thin film transistor and a pixel electrode;

a second substrate including a counter electrode;

a liquid crystal;

a plurality of gap holding members formed by etching an insulating film; and a microlens array including a plurality of microlenses, wherein:

the first substrate faces the second substrate through the thin film transistor, the pixel electrode, the counter electrode, the liquid crystal, and the plurality of gap holding members;

the microlens array is provided in the second substrate at a side opposite to the first substrate; and one of the gap holding members is selectively formed over a contact hole in which the pixel electrode is connected with a wiring connected with the thin film transistor.

67. The projector according to claim 66 wherein said plurality of gap holding members are arranged with a constant interval.

68. A projector having at least one liquid crystal panel, said liquid crystal panel comprising:

a first substrate including a plurality of thin film transistors and a plurality of pixel electrodes;

a second substrate including a counter electrode;

a liquid crystal;

a plurality of gap holding members formed by etching an insulating film; and a microlens array including a plurality of microlenses, wherein:

the plurality of thin film transistors control potentials applied to the plurality of pixel electrodes;

the first substrate faces the second substrate through the plurality of thin film transistors, the plurality of pixel electrodes, the counter electrode, the liquid crystal, and the plurality of gap holding members;

the microlens array is provided on a surface of the second substrate, the surface being opposite to a surface that faces the first substrate;

the plurality of microlenses are provided on one-on-one basis with respect to the plurality of pixels, the gap holding members are selectively formed over contact holes in which each of the plurality of pixel electrodes is connected with a wiring connected with one of the plurality of thin film transistors.

69. The projector according to claim 68 wherein said plurality of gap holding members are arranged with a constant interval.

* * * * *